US011599828B2

(12) United States Patent
Wang et al.

(10) Patent No.: US 11,599,828 B2
(45) Date of Patent: Mar. 7, 2023

(54) MANAGEMENT AND OPERATION OF LOOSELY COUPLED INTERNET OF THINGS DEVICES

(71) Applicant: MICROSOFT TECHNOLOGY LICENSING, LLC, Redmond, WA (US)

(72) Inventors: Bin Wang, Bellevue, WA (US); Robert Zhu, Bellevue, WA (US); Ying N. Chin, Bellevue, WA (US); Dejun Zhang, Bellevue, WA (US); Weiyou Cui, Redmond, WA (US); Pengxiang Zhao, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 421 days.

(21) Appl. No.: 16/803,889

(22) Filed: Feb. 27, 2020

(65) Prior Publication Data

US 2021/0272703 A1    Sep. 2, 2021

(51) Int. Cl.
| | | |
|---|---|---|
| *G06N 20/20* | (2019.01) | |
| *G16Y 20/10* | (2020.01) | |
| *G16Y 40/10* | (2020.01) | |
| *G16Y 30/00* | (2020.01) | |
| *G06N 5/04* | (2006.01) | |
| *G06N 20/00* | (2019.01) | |

(52) U.S. Cl.
CPC ............. *G06N 20/00* (2019.01); *G06N 5/04* (2013.01); *G16Y 20/10* (2020.01); *G16Y 30/00* (2020.01); *G16Y 40/10* (2020.01)

(58) Field of Classification Search
CPC ......... H04L 63/02; H04L 67/12; G16Y 40/00; G16Y 20/10; G16Y 30/00
USPC .......................................................... 706/12
See application file for complete search history.

(56) References Cited

U.S. PATENT DOCUMENTS

| | | | | |
|---|---|---|---|---|
| 10,482,299 | B1* | 11/2019 | Kayara | G06F 16/9554 |
| 11,057,344 | B2* | 7/2021 | Whittle | H04L 63/105 |
| 2016/0301707 | A1* | 10/2016 | Cheng | H04L 67/12 |
| 2016/0366183 | A1* | 12/2016 | Smith | H04L 63/06 |
| 2016/0366188 | A1* | 12/2016 | Smith | G06F 21/62 |
| 2017/0257341 | A1* | 9/2017 | Arsenault | H04L 67/51 |
| 2018/0096261 | A1* | 4/2018 | Chu | G06N 20/20 |
| 2018/0316555 | A1* | 11/2018 | Salgueiro | H04L 41/0816 |
| 2019/0205774 | A1* | 7/2019 | Ba | G06Q 50/06 |
| 2020/0143334 | A1* | 5/2020 | Kayara | G06Q 10/087 |
| 2020/0364563 | A1* | 11/2020 | Lumezanu | G06K 9/6257 |
| 2021/0133670 | A1* | 5/2021 | Cella | G06N 5/04 |

(Continued)

OTHER PUBLICATIONS

"International Search Report and Written Opinion Issued in PCT Application No. PCT/US2021/014042", dated Mar. 24, 2021, 11 Pages.

*Primary Examiner* — Tauqir Hussain
(74) *Attorney, Agent, or Firm* — Newport IP, LLC; Leonard J. Hope

(57) ABSTRACT

A loose coupling between Internet of Things ("IoT") devices and environmental sensors is generated. Once the loose coupling has been generated, conditions in a physical environment can be managed utilizing the loosely coupled devices. For example, a hybrid machine learning/expert system can be utilized to activate the IoT devices in an environment to achieve a desired condition in an optimized manner.

20 Claims, 25 Drawing Sheets

(56) References Cited

U.S. PATENT DOCUMENTS

| | | | |
|---|---|---|---|
| 2021/0152435 A1* | 5/2021 | Poteat | H04L 41/147 |
| 2021/0182996 A1* | 6/2021 | Cella | G06Q 30/0202 |
| 2021/0194608 A1* | 6/2021 | Yao | H04B 1/005 |
| 2021/0266736 A1* | 8/2021 | Fischer | H04W 12/63 |
| 2021/0349447 A1* | 11/2021 | Bhat | G05B 19/4185 |
| 2022/0036302 A1* | 2/2022 | Cella | G06Q 10/083 |

\* cited by examiner

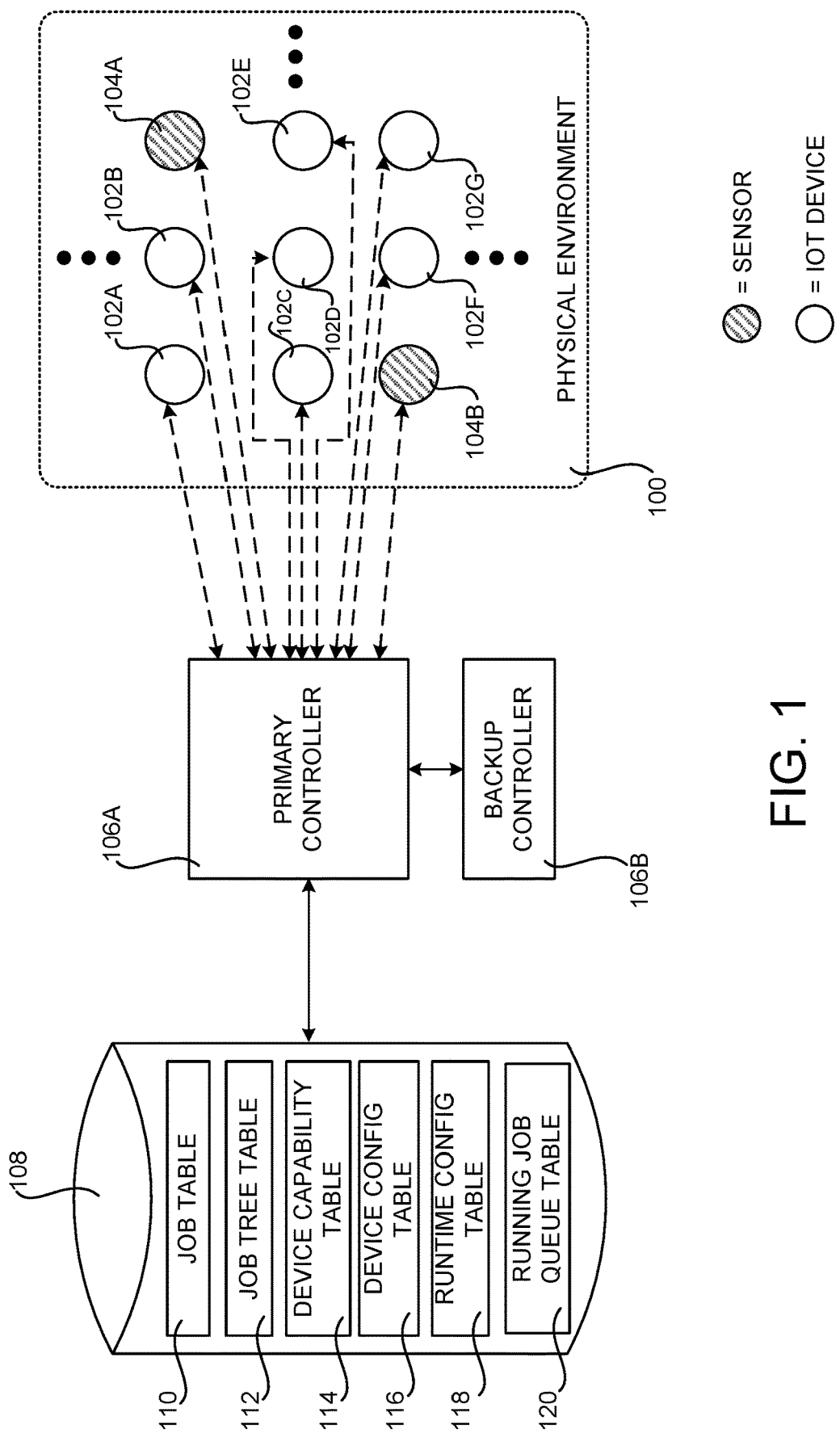

DEVICE CAPABILITY TABLE (114)

| DEVICE | CAPABILITIES | | |
|---|---|---|---|
| | TEMP | HUMIDITY | LIGHT |
| A | - | - | X |
| B | - | - | X |
| C | - | - | X |

FIG. 2A

JOB TABLE (110)

| JOB | DEVICE | | |
|---|---|---|---|
| | A | B | C |
| 1 | X | - | X |

FIG. 2B

RUNNING JOB QUEUE TABLE (120)

| JOB | DEVICE | | |
|---|---|---|---|
| | A | B | C |
| 1 | RUNNING | - | HUNG |

FIG. 2C

DEVICE CONFIG TABLE (116)

| JOB | DESIRED CONDITIONS | | |
|---|---|---|---|
| | TEMP | HUMIDITY | LIGHT |
| 1 | - | - | 100 LUMEN |

FIG. 2D

JOB TREE TABLE (112)

| PRIMARY DEVICE | BACKUP DEVICE | | |
|---|---|---|---|
| | A | B | C |
| A | | + | + |
| B | + | | + |
| C | + | + | |

FIG. 2E

RUNTIME CONFIG TABLE (118)

| DEVICE | TIMING | |
|---|---|---|
| | PING | PONG |
| A | 5MS | 15S |
| B | 5MS | 15S |
| C | 5MS | 15S |

FIG. 2F

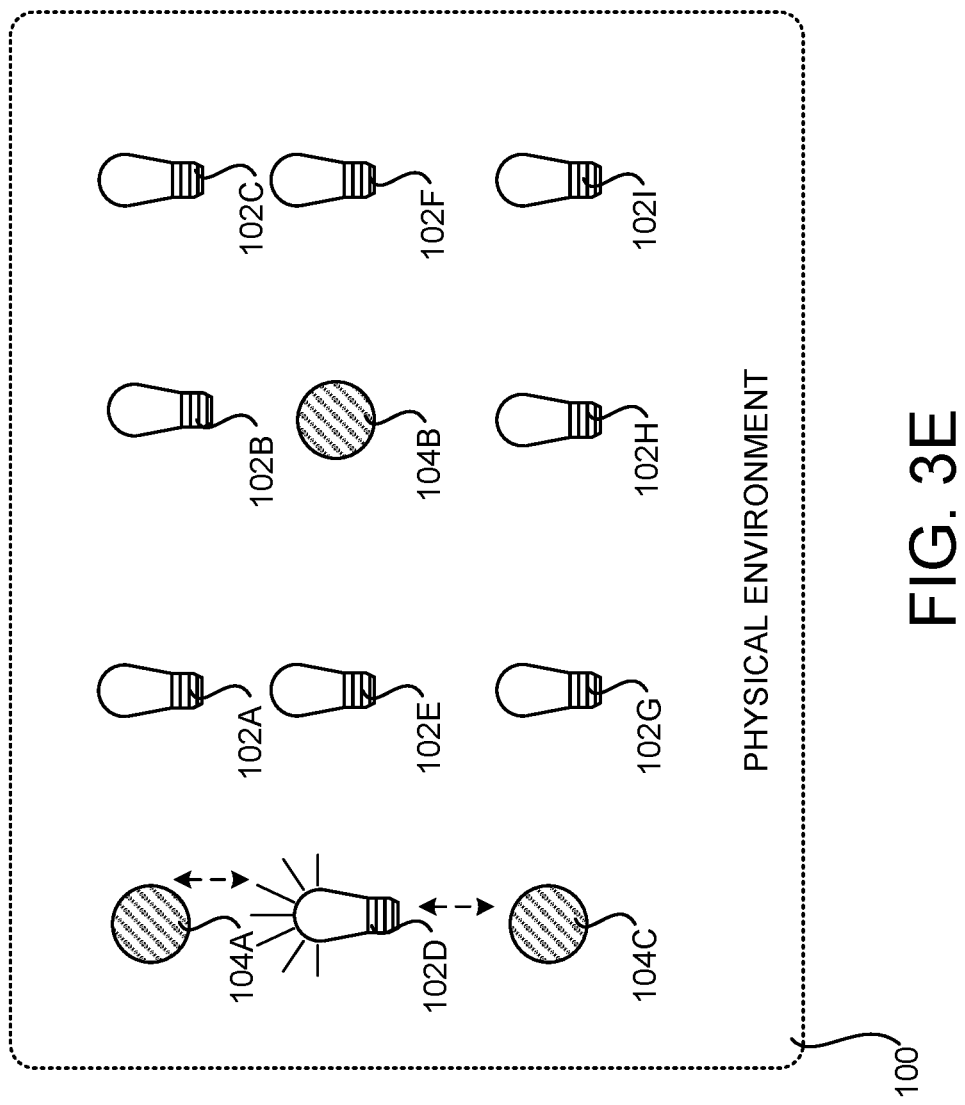

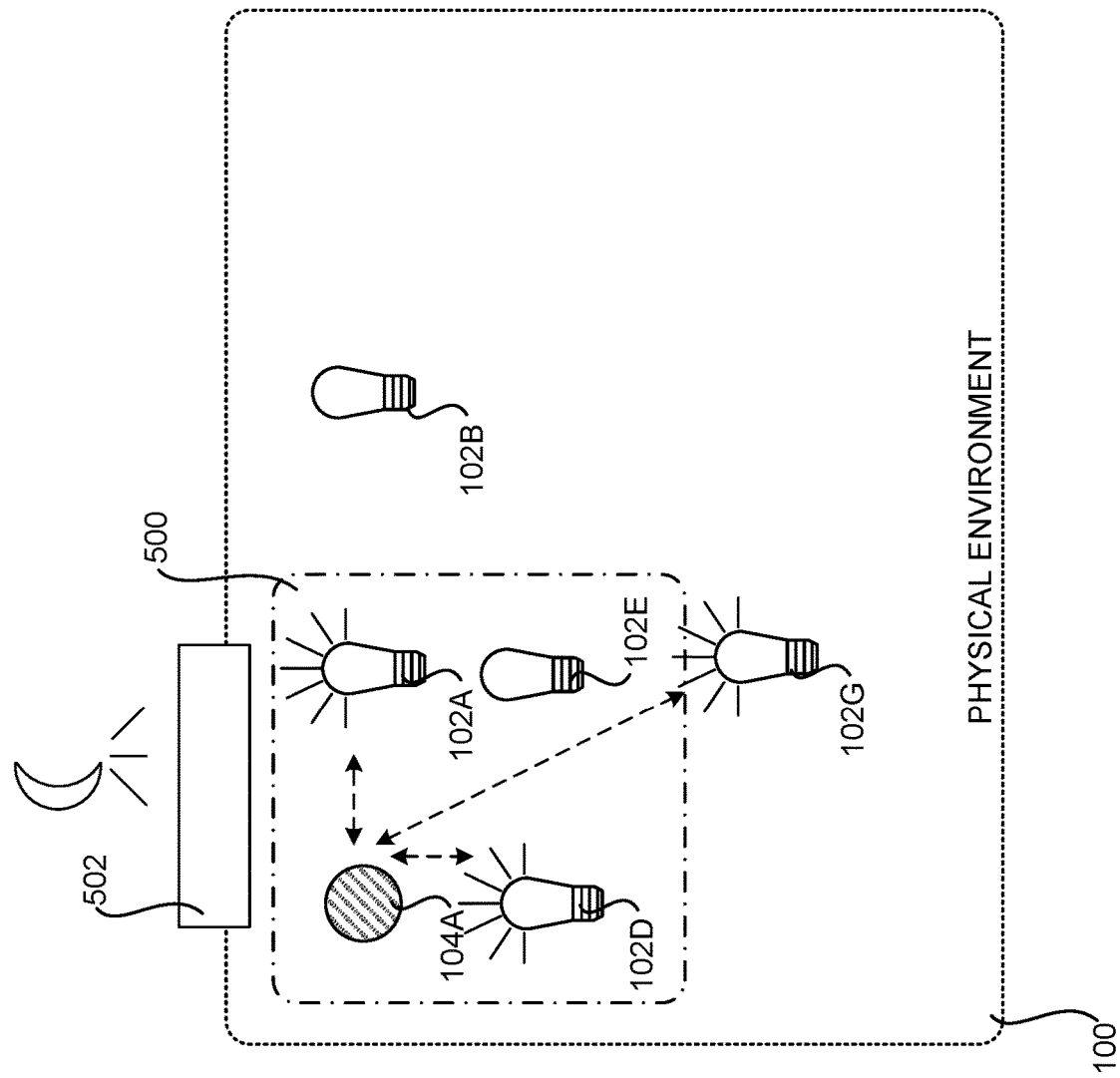

MANAGEMENT AND OPERATION OF LOOSELY COUPLED INTERNET OF THINGS DEVICES

BACKGROUND

More computing devices are connected to the internet today than ever before. Many of these devices are Internet of Things ("IoT") devices. IoT devices are computing devices that feature an internet protocol ("IP") address for enabling internet connectivity and the communication that occurs between IoT devices and other internet-connected devices and systems.

IoT devices include a diverse range of computing devices and everyday objects that utilize embedded technology to communicate and interact with the external environment via the internet. Examples of IoT devices include, but are not limited to, connected security systems, thermostats, cars, electronic appliances, lights in household and commercial environments, alarm clocks, speaker systems, vending machines, voice-driven devices, and others.

There are many scenarios where it is desirable to configure the operational states of all or a subset of IoT devices in a physical environment in a particular way. For example, a user might want to disable a subset of the IoT devices in an environment in order to save energy, while at the same time leaving another subset of devices in the environment powered on. As a specific example, an individual might want to have as many IoT-enabled lightbulbs as possible in their home turned off while they are on vacation, while at the same time leaving some lightbulbs on at night to provide a desired amount of light for security.

In another example scenario, a warehouse might be configured with hundreds or even thousands of IoT-enabled lightbulbs. In order to save power, the operator of the warehouse might want to have as many lightbulbs as possible turned off whenever possible with certain restrictions. For instance, the operator might want just enough light to be provided in the warehouse at night to ensure that a video monitoring system can operate properly. During other times of the day, the operator might desire that as many bulbs as possible be turned off while maintaining enough light for safe working conditions, even considering ambient light such as that coming in through a skylight or from another source.

It can be difficult for users to configure IoT devices to behave as in the scenarios described above using current technologies. For example, users might have to manually create groupings of very specific IoT devices. Users might also have to manually set operational parameters for all of the devices in an environment or a sub-portion of the environment.

The problems described above can be exacerbated when heterogenous device types are present in an environment. For instance, when dimmable and non-dimmable bulbs having different wattage ratings are present in the same environment. Configuring IoT devices to achieve a certain result in an environment can be even more complicated when physical conditions in an environment might change randomly, such as the amount of light coming into an environment through a skylight at during different times of the day or during different weather conditions.

As a result of the difficulty encountered in configuring IoT devices for a specific environment using current technologies, some IoT devices might remain powered on that could otherwise be powered off, thereby needlessly consuming power. It is with respect to these and other technical challenges that the disclosure made herein is presented.

SUMMARY

Technologies are disclosed herein for managing and operating loosely coupled IoT devices. In order to realize the technical benefits mentioned briefly above, and potentially others, a loose coupling, or association, between IoT devices and environmental sensors in an environment can be automatically generated without user input. For example, IoT light bulbs can be associated with ambient light sensors in a physical environment, like a home or warehouse.

Once the IoT devices and the environmental sensors in the environment have been loosely coupled, a subset of the IoT devices in the environment can be activated in a manner that minimizes their combined power consumption while at the same time providing a desired condition, or conditions, within the environment, such as the level of lighting, humidity, or temperature. In some embodiments, for example, a hybrid machine learning ("ML")/expert system can be utilized to activate the IoT devices in an environment to achieve a desired condition in an optimized manner.

The disclosed technologies can free users from having to manually group IoT devices and manually set operational parameters of the devices in order to achieve a desired condition in a physical environment as required by conventional technologies. This can result in the conservation of power and other benefits. Other technical benefits not specifically mentioned herein can also be realized through implementations of the disclosed subject matter.

Loosely Coupling IoT Devices and Environmental Sensors

According to various embodiments disclosed herein, a loose coupling or association between IoT devices and environmental sensors in a physical environment is determined. IoT devices and the environmental sensors are loosely coupled in the sense that their association does not need to be manually defined by a user, the IoT devices and environmental sensors do not have to be located in precise pre-defined locations within an environment, and IoT devices can be coupled with multiple environmental sensors in the same environment. Data defining the association between the IoT devices and the environmental sensors in the physical environment can then be stored. For example, data might be stored that identifies the IoT devices in a physical environment that are associated with each environmental sensor in the environment.

In one specific embodiment, the data defining the association between the IoT devices and the environmental sensors in an environment is generated by activating individual IoT devices or sub-combinations of IoT devices in the environment at a time. For example, one IoT-enabled light bulb might be activated at a time. Following activation of each IoT device, data can be received from the environmental sensors in the environment that indicates whether activation of the IoT device was detected. For instance, the data might indicate the amount of light that was detected by an environmental sensor.

Data describing an association between IoT devices and environmental sensors in the environment that detected activation of the IoT device can then be stored. For example, data can be stored that associates IoT-enabled lightbulbs with the environmental sensor, or sensors, that detected light when the light bulbs were turned on. As discussed above, IoT devices can be coupled with multiple environmental sensors in the same environment.

The process described above can be repeated for all of the IoT devices in an environment individually until each IoT device has been associated with at least one environmental sensor (e.g. until all of the IoT-enabled lightbulbs in an environment have been associated with at least one ambient light sensor). This process can be utilized with any type of IoT device that causes a detectable change to the conditions in a physical environment (e.g. IoT-enabled thermostats, IoT-enabled humidity sensors, etc.). Details regarding this aspect will be provided below with regard to FIGS. 1-4.

Managing Conditions in a Physical Environment Using Loosely Coupled IoT Devices and Environmental Sensors The embodiments disclosed herein also include a system for managing the conditions in a physical environment using loosely coupled IoT devices and environmental sensors. The system disclosed herein includes a primary controller that is communicatively coupled (e.g. through an appropriate wired or wireless network) to the IoT devices and the environmental sensors in the environment. A backup controller can also be provided for use in the event of failure of the primary controller.

The primary controller maintains a data store that includes data for use in managing the conditions in the physical environment. For example, and without limitation, the data store can store data that describes the association between the IoT devices and the environmental sensors in the physical environment generated in the manner described above. The data store can also store other types of data such as, but not limited to, a job table, a job tree table, a device capability table, a device configuration table, a runtime configuration table, and a running job queue table. Details regarding the structure and use of each of these tables will be provided below.

The data stored by the primary controller can define a desired condition in an environment. For instance, an operator of a warehouse might specify that the warehouse is to have a certain level of light during a particular time of day (e.g. a minimum level of light at night that is required to operate a video security system). Once data describing the desired condition in the physical environment has been stored, the disclosed system can activate IoT devices in the environment in order to achieve the desired condition. As discussed above, a user does not need to manually set operational parameters of the devices in order to achieve the desired condition in the physical environment as required by conventional technologies.

In order to achieve a desired condition, the disclosed system selects (e.g. randomly or in another manner) an IoT device in the physical environment and activates the device. For instance, the primary controller might cause an IoT-enabled lightbulb to turn on. The primary controller then obtains sensor data from the environmental sensor, or sensors, associated with the enabled IoT device and determines whether the desired condition in the environment has been achieved. If the desired condition has been achieved, this process can be discontinued.

If the desired condition in the physical environment has not been achieved, the primary controller selects another IoT device in the environment and activates the device after a random or pre-defined delay period. For example, in the case of IoT-enabled lightbulbs, one bulb might be turned on following a random or deterministic delay after another bulb was turned on. IoT devices can be turned on in a randomly selected or pre-defined order (e.g. in order of lowest power consumption per unit of light).

Following the activation of the next IoT device, additional readings can be taken from the environmental sensor, or sensors, associated with the IoT device. If the desired condition in the physical environment has not been achieved, the primary controller selects another IoT device in the environment and activates the device after a delay period. This process continues until the desired condition has been achieved in the physical environment.

The process described above can also be used to obtain a desired condition in a physical environment other than a level of light. For instance, IoT-enabled thermostats and dehumidifiers can be used in conjunction with temperature sensors or humidity sensors, respectively, to achieve a desired temperature or humidity in an environment.

The process described above can also be repeated periodically to account for changing environmental conditions. For example, the amount of ambient light in an environment might change during the night as a result of moonlight coming in through a skylight and, as a result, it might be possible to turn off additional IoT-enabled lightbulbs while maintaining the same total amount of light in the environment. This process can be repeated similarly to account for changes in temperature or humidity during the day. Details regarding this aspect will be provided below with regard to FIGS. 5A-6.

Hybrid Machine Learning/Expert System for Provisioning IoT Devices in an Environment to Achieve a Desired Condition As discussed briefly above, a hybrid ML/expert system can be utilized to provision the IoT devices in an environment to achieve one or more desired conditions in an optimized manner in some embodiments. In particular, information, which might be referred to herein as "training data," can be collected from the IoT devices in the environment and/or other similar environments. For example, information used to previously provision the IoT devices in the environment or in other similar environments ("prior provisioning information") might be collected. The training data might also include information describing the output of the IoT devices when configured using the prior provisioning information.

The information can be utilized to train a ML model capable of generating initial provisioning settings for the IoT devices in the environment. In particular, the initial provisioning settings can specify a set of the IoT devices in the environment which, when activated, will achieve one or more desired conditions in the environment. For example, the ML model might be trained to generate a set of initial provisioning settings that defines a set of IoT-enabled lightbulbs which, when enabled, will provide a desired level of light in a particular portion of a warehouse while keeping power consumption below a specified value. The initial provisioning settings generated by the ML model can identify the devices and, potentially, operational parameters (e.g. an output level (e.g. brightness)) for the IoT devices.

Modified provisioning settings are generated from the initial provisioning settings in some embodiments. For example, the initial provisioning settings generated by the ML model can be modified by an expert system in some embodiments to generate modified provisioning settings. For example, and without limitation, an expert system might apply rules to the initial provisioning settings generated by the ML model to generate the modified provisioning settings. IoT devices in the environment can then be activated using the modified provisioning settings in the manner described above to achieve the desired condition.

The rules that the expert system applies initial provisioning settings generated by the ML model can include, but are not limited to, rules configured to add an IoT device to the initial provisioning settings generated by the ML model, rules configured to remove an IoT device from the initial provisioning settings generated by the ML model, rules configured to increase or decrease an output for an IoT device in the initial provisioning settings generated by the ML model, rules specifying a minimum output or a maximum output for an IoT device in the initial provisioning settings generated predicted by the ML model, rules for specifying a time at which the IoT devices are to be activated, or rules specifying one or more conditions under which the IoT devices are to be activated. The rules can also be specific to the environment. The expert system can apply other types of rules to the output of the ML model in other configurations. Details regarding this aspect will be provided below with regard to FIGS. 7-9.

It should be appreciated that the subject matter disclosed herein can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a network architecture diagram that shows aspects of an illustrative configuration for a system disclosed herein for managing and operating loosely coupled IoT devices, according to one embodiment;

FIGS. 2A-2F are data structure diagrams illustrating aspects of several data tables utilized by the illustrative system shown in FIG. 1, according to one embodiment;

FIGS. 3A-3J are device configuration diagrams illustrating aspects of one mechanism disclosed herein for generating data describing a loose coupling between IoT devices and environmental sensors in a physical environment, according to one embodiment;

FIGS. 5A-5E are device configuration diagrams illustrating aspects of one mechanism disclosed herein for managing the conditions in a physical environment using loosely coupled IoT devices and environmental sensors, according to one embodiment;

DETAILED DESCRIPTION

Figure 3A:
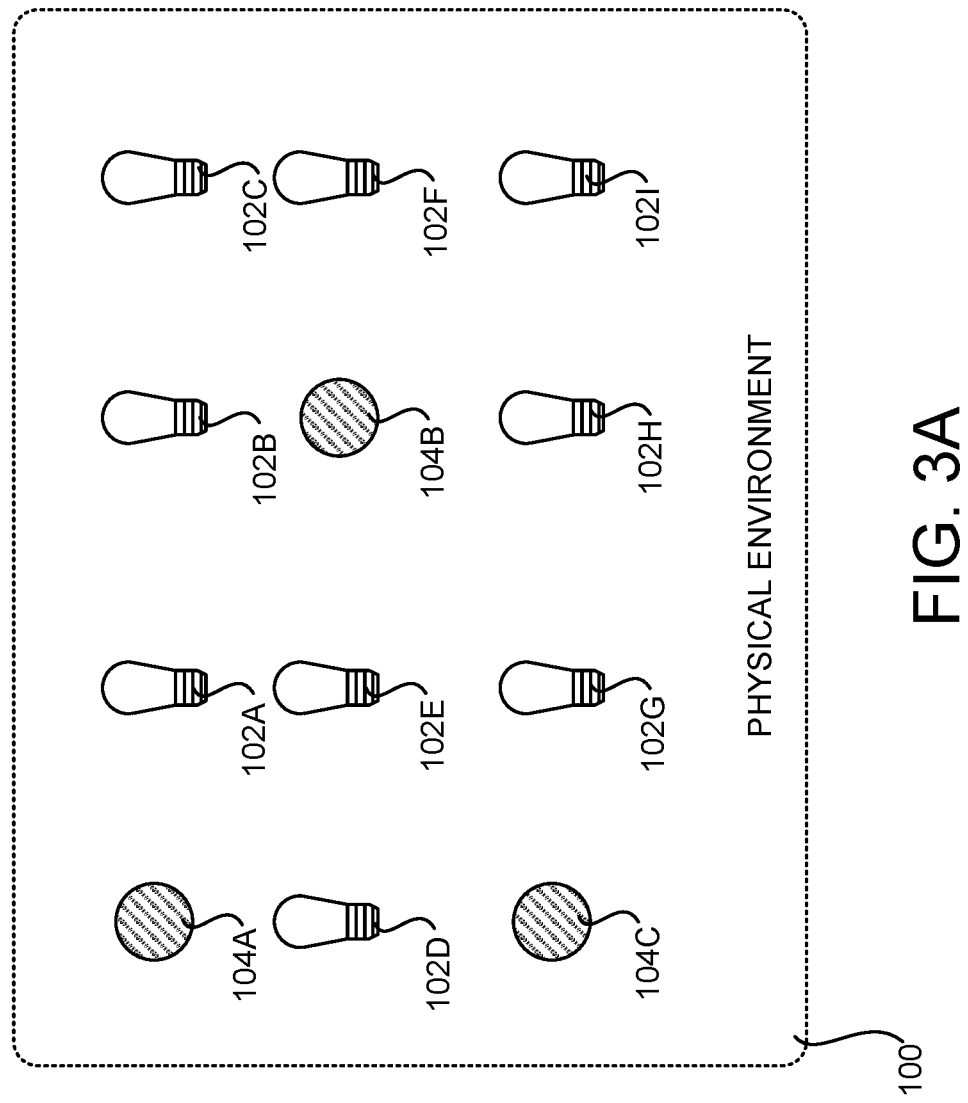
Figure 3B:
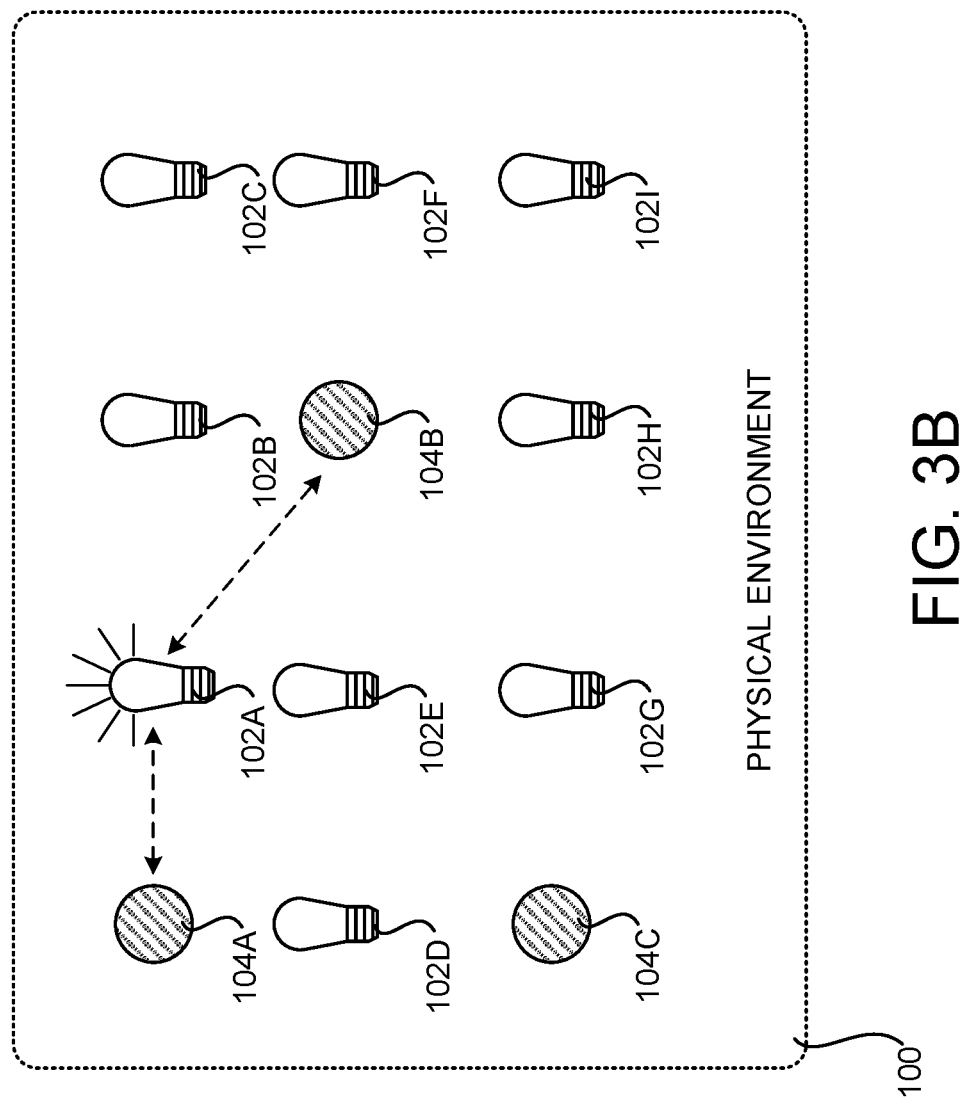
Figure 3C:
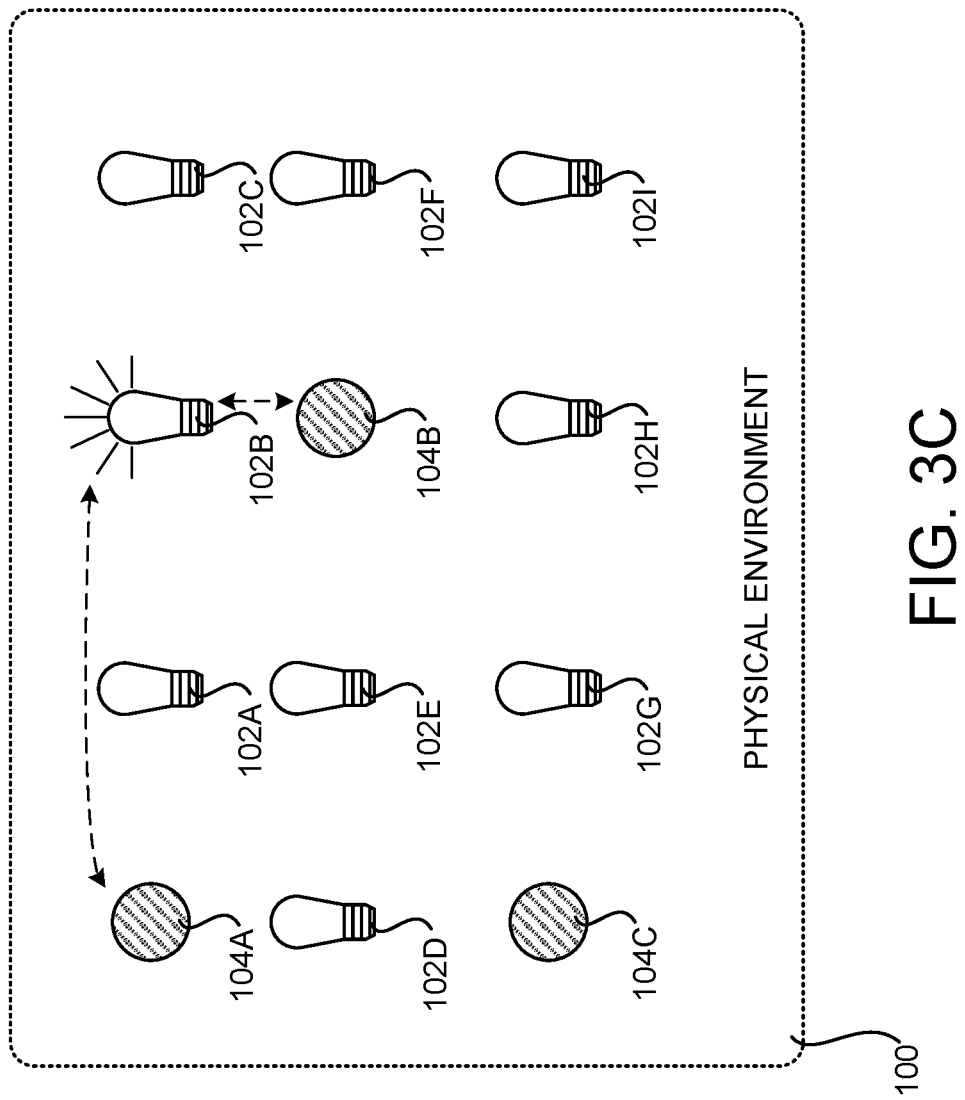

The following detailed description is directed to technologies for managing and operating loosely coupled IoT devices. As will be described in greater detail below, a loose coupling, or association, between IoT devices and environmental sensors in an environment can be automatically generated without user input. Once the IoT devices and the environmental sensors in an environment have been loosely coupled, a subset of the IoT devices in the environment can be activated in a manner that minimizes power consumption while at the same time providing a desired condition, or conditions, within the environment, such as the level of lighting, humidity, or temperature.

As mentioned briefly above, the disclosed technologies can free users from having to manually group IoT devices and manually set operational parameters of the devices in order to achieve a desired condition in a physical environment as required by conventional technologies. This can result in the conservation of power and other technical benefits, some of which are described herein.

While the subject matter described herein is primarily presented in the context of IoT devices, those skilled in the art will recognize that the disclosed technologies might be utilized by other types of computing devices. Those skilled in the art will also appreciate that the subject matter described herein can be practiced with various computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for managing and operating loosely coupled IoT devices will be described.

FIG. 1 is a network architecture diagram that shows aspects of an illustrative configuration for a system disclosed herein for managing and operating loosely coupled IoT devices 102 (which might be referred to herein as "devices 102" for simplicity) in a physical environment 100, according to one embodiment. As discussed briefly above, IoT devices 102 are computing devices that feature a wired or wireless network interface and associated IP address for enabling internet connectivity and the communication that occurs between IoT devices 102 and other internet-connected devices and systems.

IoT devices 102 include a diverse range of computing devices and everyday objects that utilize embedded technology to communicate and interact with the external environment via the internet. Examples of IoT devices 102 include, but are not limited to, connected security systems, thermostats, cars, electronic appliances, light bulbs in household and commercial environments, alarm clocks, speaker systems, vending machines, voice-driven devices, and others. Accordingly, the term "IoT device" as used herein is not limited to any particular type of computing device.

In the example shown in FIG. 1, IoT devices 102A-102G have been installed in a physical environment 100. The physical environment 100 might be a home environment, a commercial environment such as a warehouse, or another type of environment. Additionally, environmental sensors 104A and 104B (which might be referred to herein simply as the "sensors 104") have also been installed in the environment 100. The sensors 104 are also IoT devices.

The environmental sensors 104 can detect various attributes of the physical environment 100 such as, but not limited to, the amount of light in the environment 100, the temperature of the environment 100, or the humidity level in the environment 100. The IoT devices 102 are typically installed in the environment 100 in conjunction with compatible sensors 104. For example, IoT-enabled lightbulbs would be utilized with ambient light sensors, IoT-enabled thermostats would be utilized with temperature sensors, and IoT-enabled dehumidifiers would be utilized with humidity sensors.

In the example configuration shown in FIG. 1, a system operates in the physical environment 100 that includes a primary controller 106A that is communicatively coupled (e.g. through an appropriate wired or wireless network) to the IoT devices 102 and the environmental sensors 104 in the environment 100. A backup controller 106B can also be provided for use in the event of failure of the primary controller 106A. In some embodiments, the IoT devices 102 are also configured for peer-to-peer communication with other IoT devices 102. The IoT devices 102 can also maintain data locally describing their own configuration, network addresses of the controllers 106 and other IoT devices 102, and other parameters.

The primary controller 106A is a software and/or hardware device that maintains a data store 1011 that includes data for use in managing the conditions in the physical environment 100. For example, and without limitation, the data store 108 can store data that describes the association between the IoT devices 102 and the environmental sensors 104 in the physical environment 100 that has been generated in the manner described above. The data store 108 can also store other types of data such as, but not limited to: a job table 110; a job tree table 112; a device capability table 114; a device configuration table 116; a runtime configuration table 118; and a running job queue table 120. Details regarding the structure and use of these tables will be provided below with respect to FIGS. 2A-6.

In order to realize the technical benefits mentioned briefly above, and potentially others, the system shown in FIG. 1 can automatically generate data describing a loose coupling, or association, between the IoT devices 102 and environmental sensors 104 in the environment 100. For example, IoT light bulbs can be associated with ambient light sensors in a physical environment 100, like a warehouse. One mechanism for generating data describing the coupling between the IoT devices 102 and the sensors 104 is described below with regard to FIGS. 3A-4.

Once the IoT devices 102 and the environmental sensors 100 in an environment 100 have been loosely coupled, the system shown in FIG. 1 can also activate all or a subset of the IoT devices 102 in the environment 100 in a manner that minimizes power consumption while at the same time providing a desired condition, or conditions, within the environment 100, such as the level of lighting, humidity, or temperature. As discussed above, this mechanism can free users from having to manually group IoT devices 102 and manually set operational parameters of the devices 102 in order to achieve a desired condition in a physical environment 100 as required by conventional technologies.

Implementations of the disclosed technologies can also result in the conservation of power and other technical benefits. Other technical benefits not specifically mentioned herein can also be realized through implementations of the disclosed subject matter. One mechanism for activating devices 102 in a physical environment 100 to achieve a desired condition is described below with regard to FIGS. 5A-6.

FIGS. 2A-2F are data structure diagrams illustrating aspects of several data tables utilized by the illustrative system shown in FIG. 1, according to one embodiment. As mentioned briefly above, the primary controller 106A can maintain a data store 108 that includes data that describes the association between the IoT devices 102 and the environmental sensors 104 in the physical environment 100. The data store 108 can also store other types of data such as, but not limited to: a job table 110; a job tree table 112; a device capability table 114; a device configuration table 116; a runtime configuration table 118; and a running job queue table 120. Each of these data tables will now be described in detail.

The device capability table 114 shown in FIG. 2A includes data that describes the capabilities of the IoT devices 102 and sensors 104 in an environment. For instance, the capabilities of three IoT-enabled light bulbs (identified as 'A,', 'B,' and 'C') have been set forth in the illustrated device capability table 114. The capabilities of many other IoT devices 102 and sensors 104 can be defined in a similar manner. In this regard, it is to be appreciated that the illustrative data structures shown in FIGS. 2A-2F and described herein have been greatly simplified for discussion purposes and that actual tables might include alternative or additional data than that described herein.

The job table 110 shown in FIG. 2B stores data that provisions IoT devices 102 according to their capabilities, as set forth in the device capability table 114, and a desired configuration. In the example job table 110 shown in FIG. 2B, a single job has been defined that includes the IoT devices 'A' and 'B.' Each job can also reference one or more entries in a device configuration table 116, an example of which is shown in FIG. 2D.

Entries in the device configuration table 116 specify aspects of a desired condition for a physical environment 100. In the illustrated example, for instance, an entry in the device configuration table 116 specifies that a physical environment is to have 100 lumens of light. Entries in the device configuration table 116 can also specify other types of conditions such as, but not limited to, an amount of humidity and/or the temperature in a physical environment.

The running job queue table 120 shown in FIG. 2C stores data defining the status of currently running jobs from the job table 110. As will be described in greater detail below, the primary controller 106A (or the backup controller 106B in the event of a failure) retrieves jobs from the job table 110 and activates IoT devices 102 in the physical environment 100 in order to achieve the desired condition in the physical environment 100.

When the primary controller 106A begins executing a job, it creates a new entry in the running job queue table 120 that includes data describing the status of each of the IoT devices 102 participating in the job. For example, and without limitation, entries in the running job queue table 120 might indicate whether an IoT device 102 is running a job, is hung (i.e. not responsive), or another type of status. Additional details regarding this process will be provided below.

The job tree table 112 shown in FIG. 2E stores data that specifies IoT devices 102 to which a running job is to be moved if other IoT devices 102 are not responsive. In the illustrated example, for instance, the job tree table 112 indicates that IoT device 13' is a backup for device 'A,' that device 'A' is a backup IoT device for device 13; and that IoT device 'C' is a backup for device 'B.' Additional details regarding the use of the data stored in the job tree table 112 will be provided below.

The device runtime configuration table 118 shown in FIG. 2F stores data defining a 'ping' value and a 'pong' value for each of the IoT devices 102 in an environment. In the illustrated example, for instance, the ping value is 5 ms and the pong value is 15s. As will be described in greater detail below, the primary controller 106A can transmit a status request message (i.e. a ping) to each of the IoT devices 102 participating in jobs on a schedule specified by the ping value in the runtime configuration table.

Each IoT device 102 should then respond within a time period defined by the pong value stored in the runtime configuration table 118. The primary controller 106A can utilize the response, or lack of a response, to update the running job queue table 120. For example, if a particular IoT device 102 does not provide a response to a ping within the specified time period, the primary controller 106A might update an entry in the running job queue table 120 to indicate that the IoT device 102 is hung. In this case, the primary controller 106A can also identify a backup IoT device 102 using the job tree table 112 and replace the current IoT device with the corresponding backup IoT device in the job table 110 and the running job queue table 120. Additional details regarding this process will be provided below.

Loosely Coupling IoT Devices and Environmental Sensors

FIGS. 3A-3J are device configuration diagrams illustrating aspects of one mechanism disclosed herein for generating data describing a loose coupling between IoT devices 102 and environmental sensors 104 in a physical environment 100, according to one embodiment. As described briefly above, the system described above with regard to FIGS. 1-2F can generate data describing a loose coupling or association between IoT devices 102 and environmental sensors 104 in a physical environment 100. Data defining the association between the IoT devices 102 and the environmental sensors 104 in the physical environment 100 can then be stored such as, for example, in the data store 108. For example, data might be stored that identifies the IoT devices 102 in the physical environment 100 that are associated with each environmental sensor 104 in the environment 100.

As also mentioned briefly above, the IoT devices 102 and the environmental sensors 104 are loosely coupled in the sense that their association does not need to be manually defined by a user, the IoT devices 102 and environmental sensors 104 do not have to be located in precise pre-defined locations within the environment 100, and IoT devices 102 can be coupled with multiple environmental sensors 104 in the same environment 100. Details regarding one illustrative mechanism for generating the association between IoT devices 102 and sensors 104 will be provided with regard to FIGS. 3A-4.

In the illustrative environment 100 shown in FIG. 3A, nine IoT devices 102A-102I have been installed along with three environmental sensors 104A-104C. In this example the IoT devices 102 are light bulbs. However, other types of IoT devices 102 can be utilized in other configurations.

As mentioned above, in one embodiment the data defining the association between the IoT devices 102 and the environmental sensors 104 in an environment 100 is generated by activating individual IoT devices 102 or sub-combinations of IoT devices 102 in the environment 100 at a time. In the example shown in FIG. 3B, for instance, a single IoT device 102A has been activated, in this case a light bulb has been turned on.

Following activation of the IoT device 102A, data can be received from the environmental sensors 104 in the environment 100 that indicates whether activation of the IoT device 102 was detected. For instance, the data might indicate the amount of light that was detected by an environmental sensor. In the illustrated example, for instance, the sensors 104A and 104B are light sensors that detected activation of the IoT device 102A. In response thereto, the sensors 104A and 104B transmit data to the primary controller 106A indicating that activation of the IoT device 102A was detected.

The primary controller 106A receives the data from the sensors 104A and 104B and stores data describing an association between the IoT device 102A and the environmental sensors 104A and 104B in the environment 100 that detected activation of the IoT device 102A. For example, the primary controller 106A might store data that associates the IoT device 102A with the environmental sensors 104A and 104B that detected light when the IoT device 102A was turned on. As discussed above, IoT devices 102 can be coupled with multiple environmental sensors 104 in the same environment 100.

The process described above can be repeated for all of the IoT devices 102 in an environment individually until each IoT device 102 has been associated with at least one environmental sensor 104 (e.g. until all of the IoT-enabled lightbulbs in an environment 100 have been associated with at least one ambient light sensor). In the example shown in FIG. 3C, for instance, the IoT device 102B is activated next and its activation is detected by the sensors 104A and 104B. In response thereto, the primary controller 104A generates and stores data defining an association between the IoT device 102B and the sensors 104A and 104B.

Figure 3D:
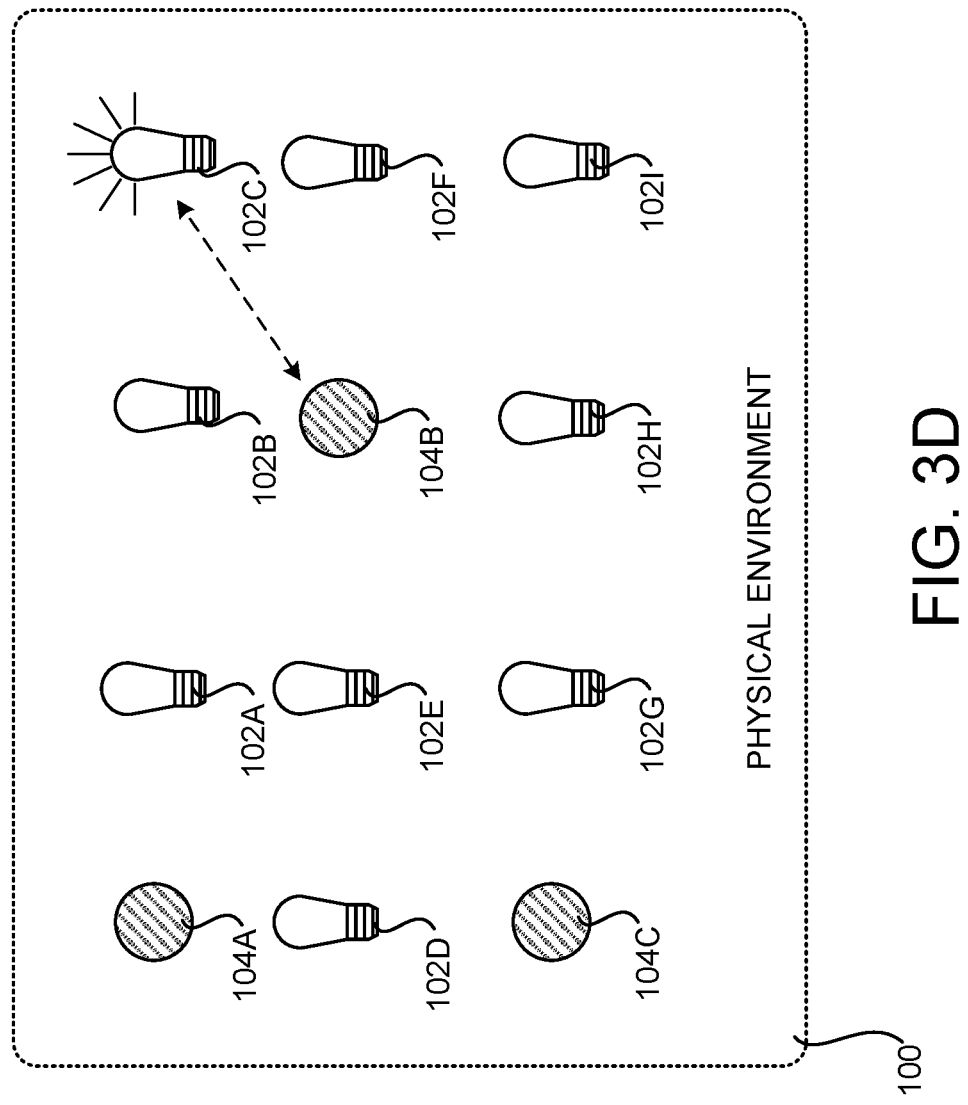
Figure 3F:
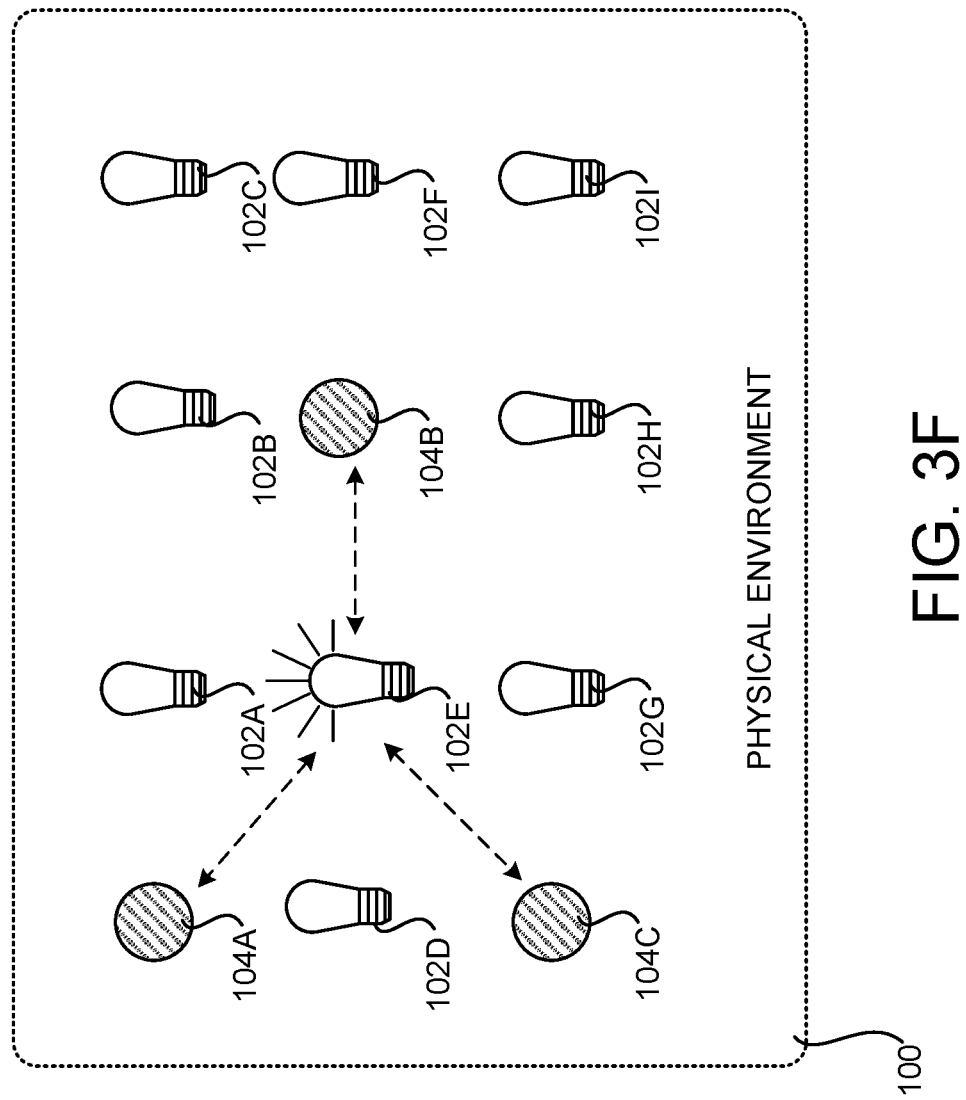
Figure 3G:
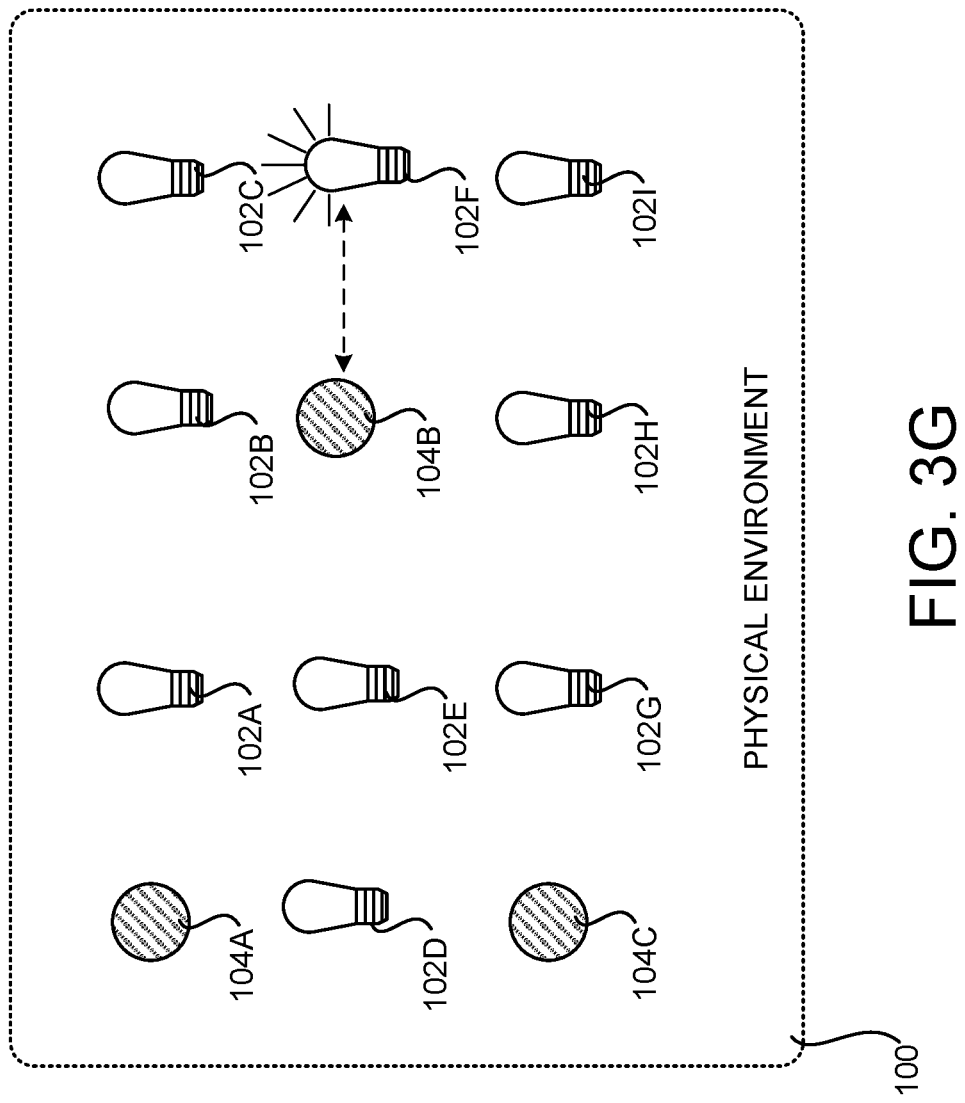
Figure 3H:
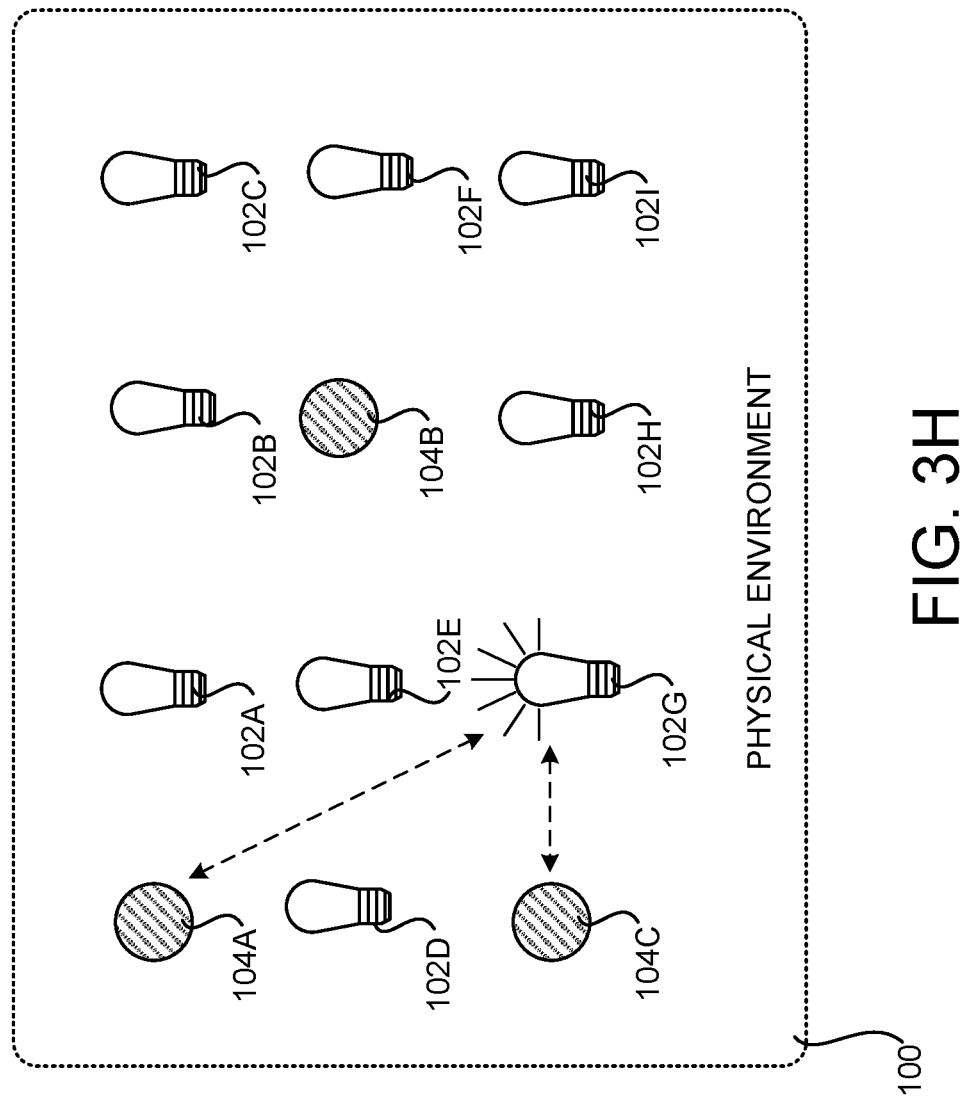
Figure 3I:
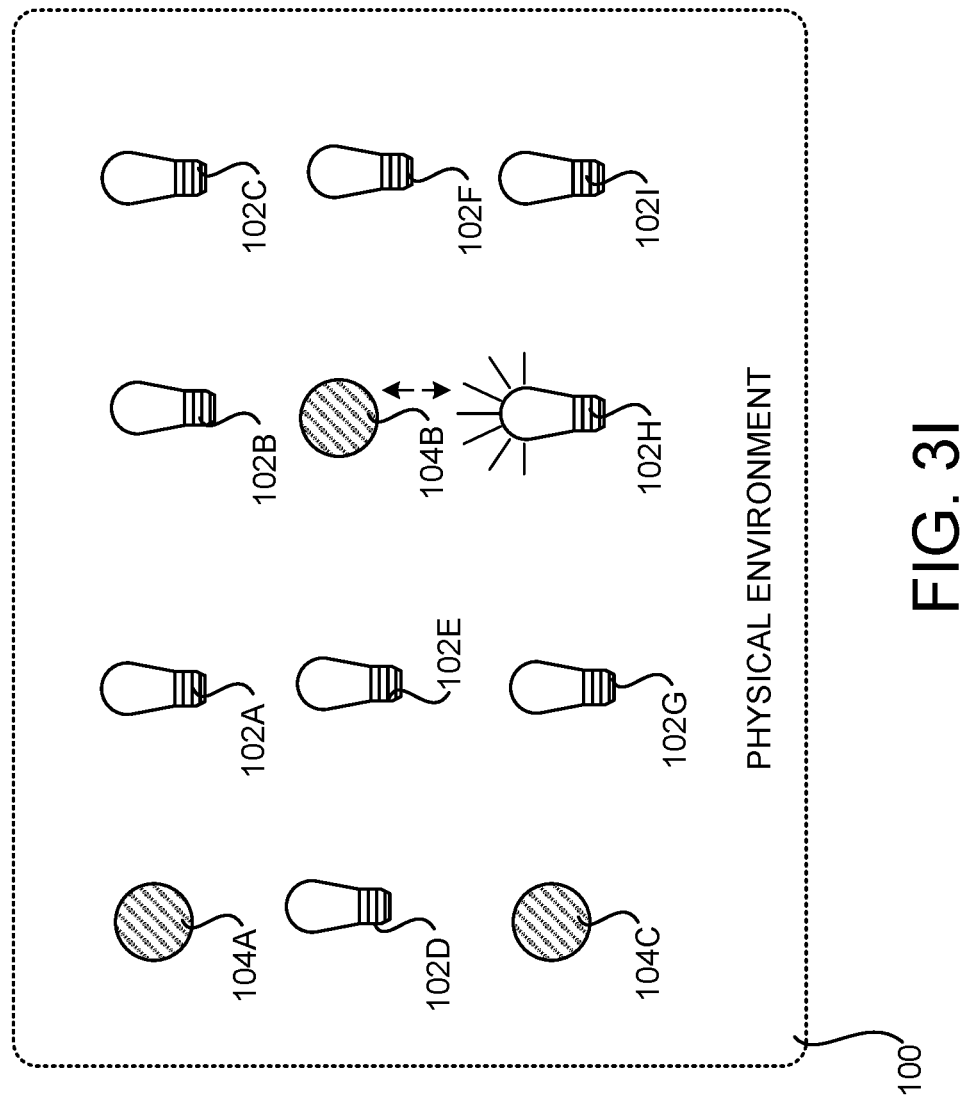

Continuing the illustrated example, the primary controller 106A next activates the IoT device 102C, as illustrated in FIG. 3D. In turn, its activation is detected by the sensor 104B, which causes the primary controller 106A to generate data associating the IoT device 102C with the sensor 104B. Next, and as illustrated in FIG. 3E, activation of the IoT device 102D is detected by the sensors 104A and 104C, which results in data being stored associating the sensors 104A and 104C and the IoT device 102D.

Figure 3J:
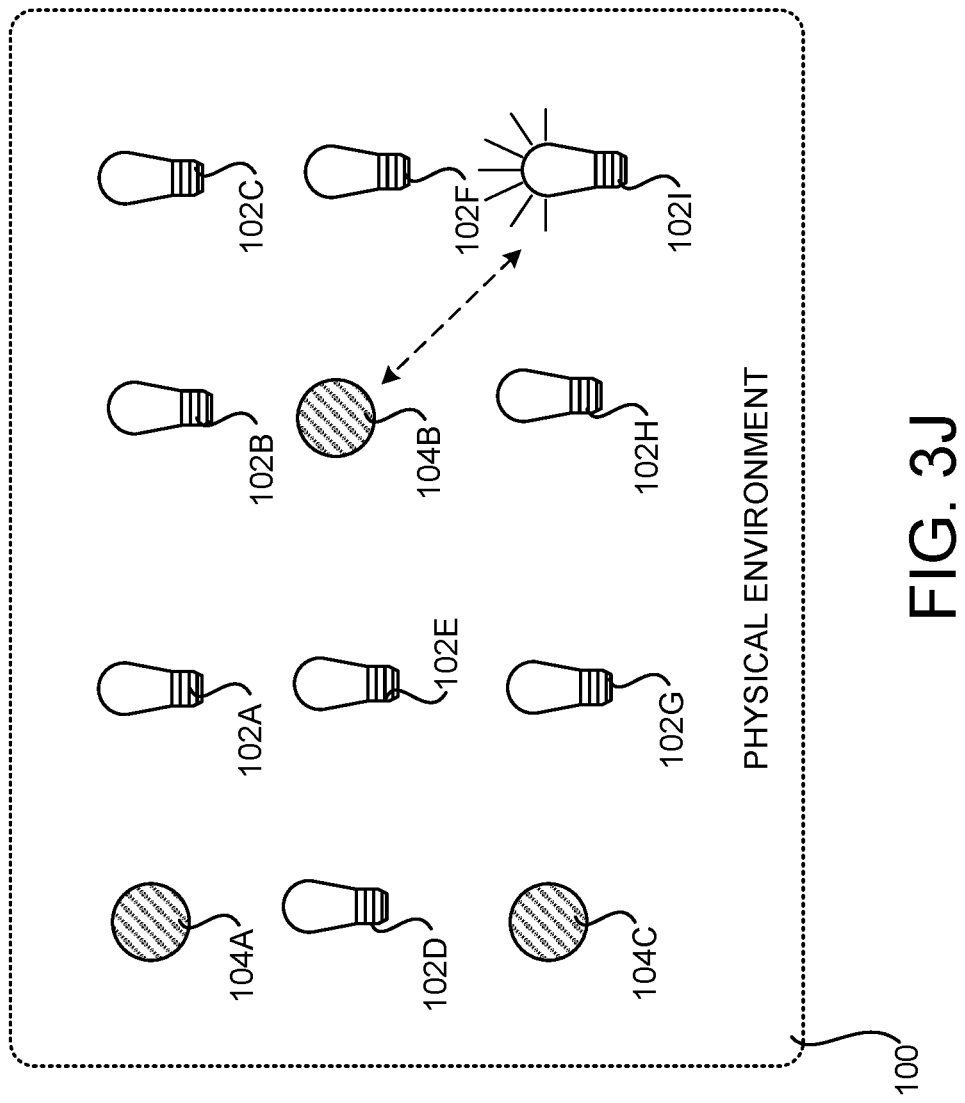

FIGS. 3F-3J continue the example of FIGS. 3A-3E. Through the operations illustrated in these FIGS., the IoT device 102E is associated with the sensors 104A, 104B, and 104C (FIG. 3F), the IoT device 104B is associated with the sensor 104B (FIG. 3G), the IoT device 102G is associated with the sensors 104A and 104C (FIG. 3H), the IoT device 102H is associated with the sensor 104B (FIG. 3I), and the IoT device 102I is associated with the sensor 104B (FIG. 3J). As discussed above, the primary controller 106A stores data defining the association between IoT devices 102 and sensors 140 detected in the manner described above.

Figure 4:
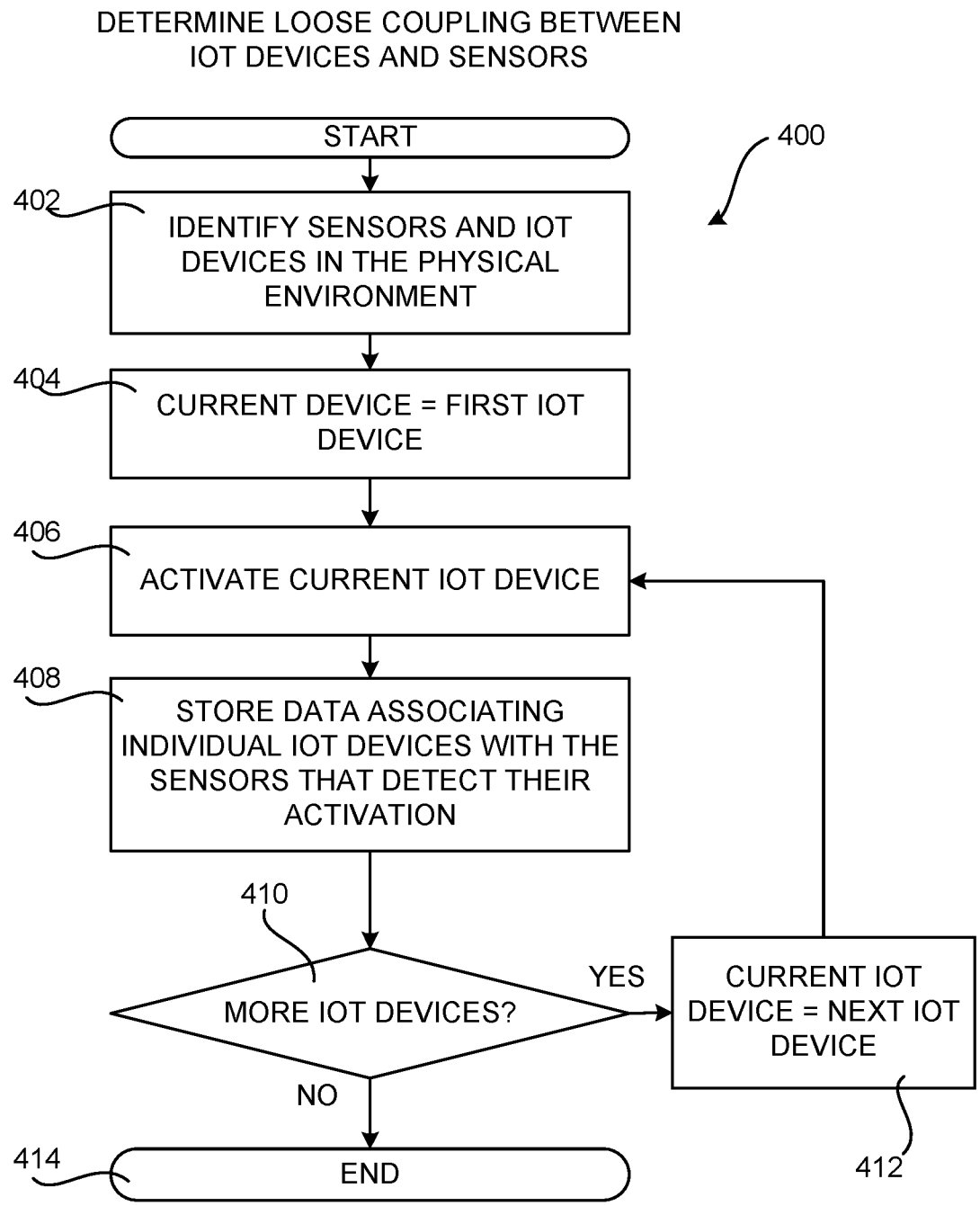
FIG. 4 is a flow diagram showing a routine that illustrates aspects of one mechanism disclosed herein for generating data describing a loose coupling between IoT devices and environmental sensors in a physical environment, according to one embodiment.

FIG. 4 is a flow diagram showing a routine 400 that illustrates aspects of one mechanism disclosed herein for generating data describing a loose coupling between IoT devices 102 and environmental sensors 104 in a physical environment 100, according to one embodiment. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

As described herein, in conjunction with the FIGS. described herein, the operations of the routine 400 are described herein as being implemented, at least in part, by an application, component, and/or circuit. Although the following illustration refers to the components shown in FIG. 1, it can be appreciated that the operations of the routine 400 might be also implemented in many other ways. For example, the routine 400 might be implemented, at least in part, by a processor of another remote computer or a local computer or circuit. In addition, one or more of the operations of the routine 400 might alternatively or additionally be implemented, at least in part, by a chipset working alone or in conjunction with other software modules. Any service, circuit or application suitable for providing the techniques disclosed herein can be used in operations described herein.

When the operations of routine 400 are implemented in software, the disclosed functionality can be provided by a dynamically linked library ("DLL"), a statically linked library, functionality produced by an application programing interface ("API"), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

The routine 400 begins at operation 402, where the primary controller 106A identifies the sensors 104 and IoT devices 102 in a physical environment 100. In one embodiment, for instance, an auto-discovery process is performed whereby the IoT devices 102 and sensors 104 in the environment 100 report their presence to the primary controller 106A. The IoT devices 102 and sensors 104 can also report their capabilities to the primary controller 106A. The primary controller 106A, in turn, can store data identifying the IoT devices 102 and sensors 104 and their capabilities such as, for instance, in the device capability table 114 described above.

Once the IoT devices 102 and sensors 104 have been identified, the routine 400 proceeds from operation 402 to operation 404, where the primary controller 106A initializes a variable to keep track of the IoT device 102 that is currently being activated. The routine 400 then proceeds from operation 404 to operation 406, where the primary controller 106A activates the first IoT device 102 in the environment 100.

From operation 406, the routine 400 proceeds to operation 408, where sensors 104 detect activation of the IoT device 102 that occurred at operation 406. As discussed above, sensors 104 that detect activation of the IoT device 102 transmit data indicating the detection of the activation of the IoT device 102 to the primary controller 106A. In turn, the primary controller 106A stores data associating the activated IoT device 102 with the sensors 104 that detected activation. In this manner, a coupling or association can be automatically created between the IoT devices 102 and sensors 104 in an environment 100.

From operation 408, the routine 400 proceeds to operation 410, where the primary controller 106A determines whether additional IoT devices 102 remain to be activated in the environment 100. If additional IoT devices 102 remain to be activated, the routine 400 proceeds from operation 410 to operation 412, where the primary controller 106A increments the variable utilized to keep track of the current IoT device 102 to identify the next IoT device 102 in the environment 100. The routine 400 then proceeds from operation 412 back to operation 406, where the process described above can be repeated. If no additional IoT devices 102 remain to be activated, the routine 400 proceeds from operation 410 to operation 414, where it ends.

Managing Conditions in a Physical Environment Using Loosely Coupled IoT Devices and Environmental Sensors FIGS. 5A-5E are device configuration diagrams illustrating aspects of one mechanism disclosed herein for managing the conditions in a physical environment 100 using loosely coupled IoT devices 102 and environmental sensors, 104 according to one embodiment. As discussed briefly above, the data stored by the primary controller 106A in the device configuration table 116 can define a desired condition in an environment 100. In the example shown in FIGS. 5A-5E, for instance, an owner of a physical environment 100 has defined data indicating that a minimum level of light is to be maintained at night in a portion 500 of a physical environment 100 that is required to operate a video security system, even taking into account moon light entering the physical environment 100 through a skylight 502.

In order to achieve the desired condition in the physical environment 100 illustrated in FIGS. 5A-5E, the disclosed system can activate IoT devices 102 in the environment 100 in order to achieve the desired condition. As discussed above, a user does not need to manually set operational parameters of the IoT devices 102 in the environment 100 in order to achieve the desired condition as required by conventional technologies.

In order to achieve a desired condition, the disclosed system selects an IoT device 102 in the physical environment 100 and activates that device 102. In the illustrated example, the primary controller 106A has selected the IoT device 102A and instructed the device to turn on. The primary controller 106A then obtains sensor data from the environmental sensor 104, or sensors, associated with the enabled IoT device 102. In this case, the IoT device 102A is associated with the sensor 104A and, therefore, the primary controller 106A obtains data from the sensor 104A indicating the amount of light in the portion 500 of the environment 100. This reading includes the light coming in through the skylight 502.

Figure 5A:
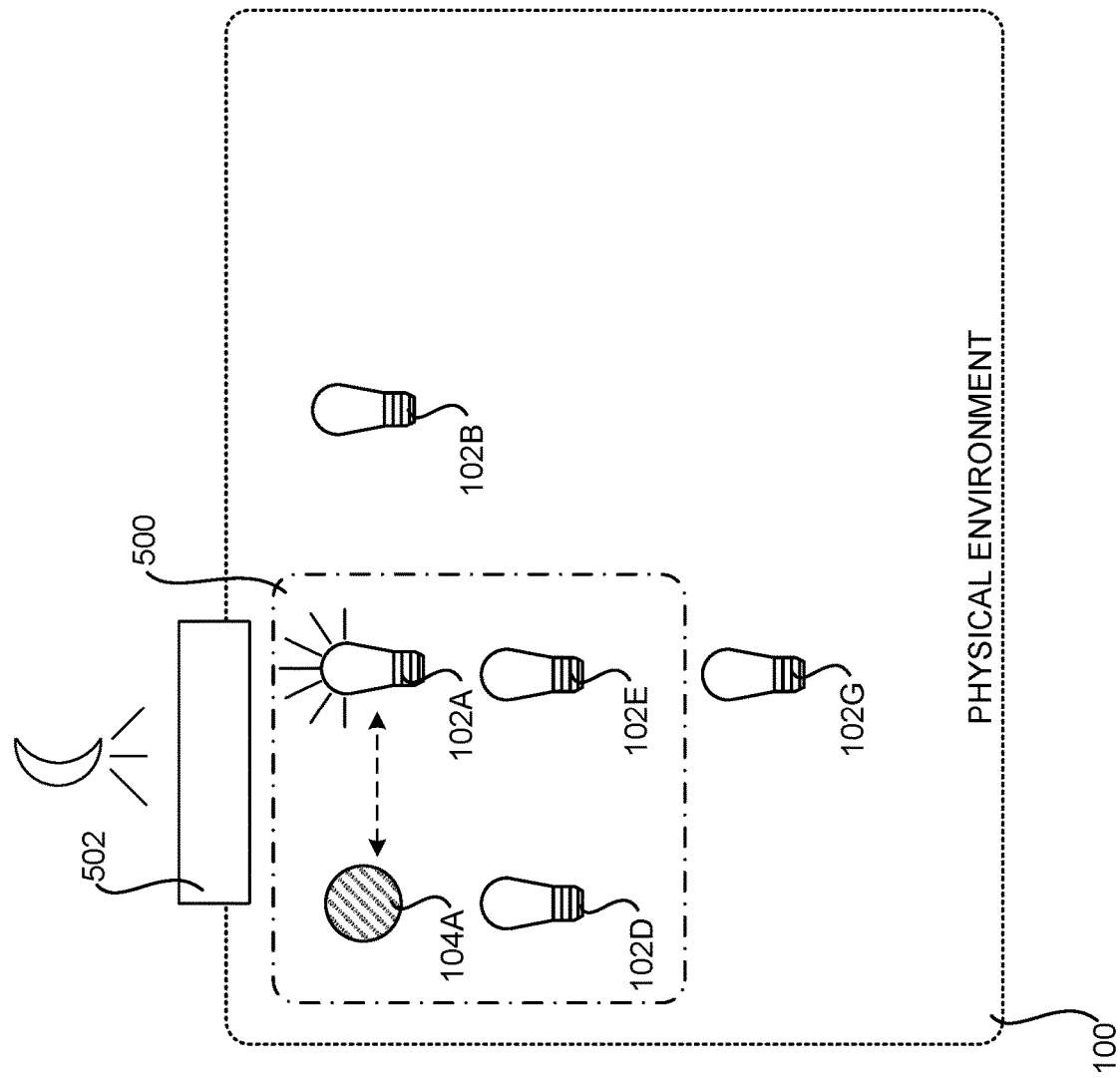
Figure 5B:
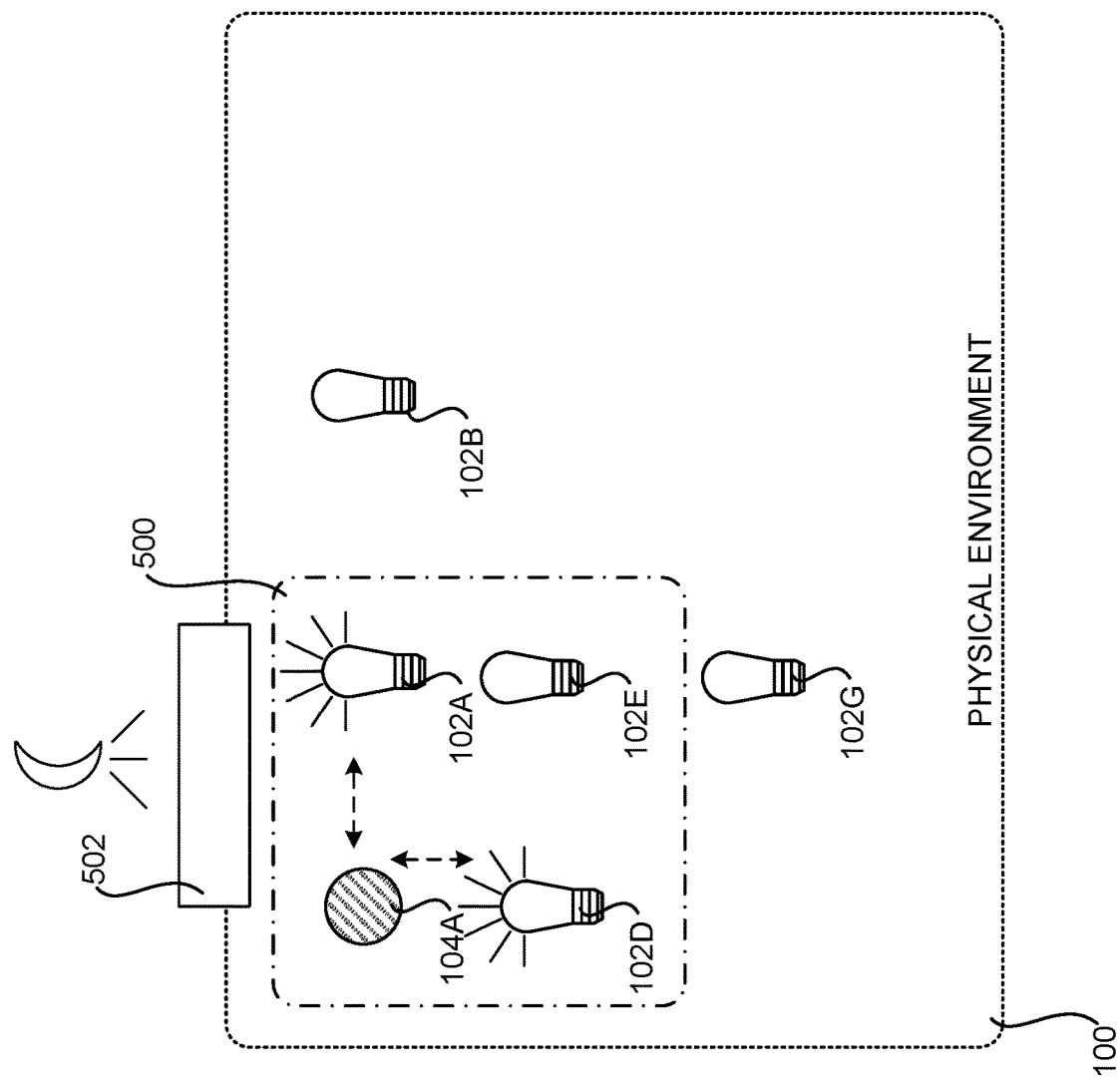
Figure 5D:
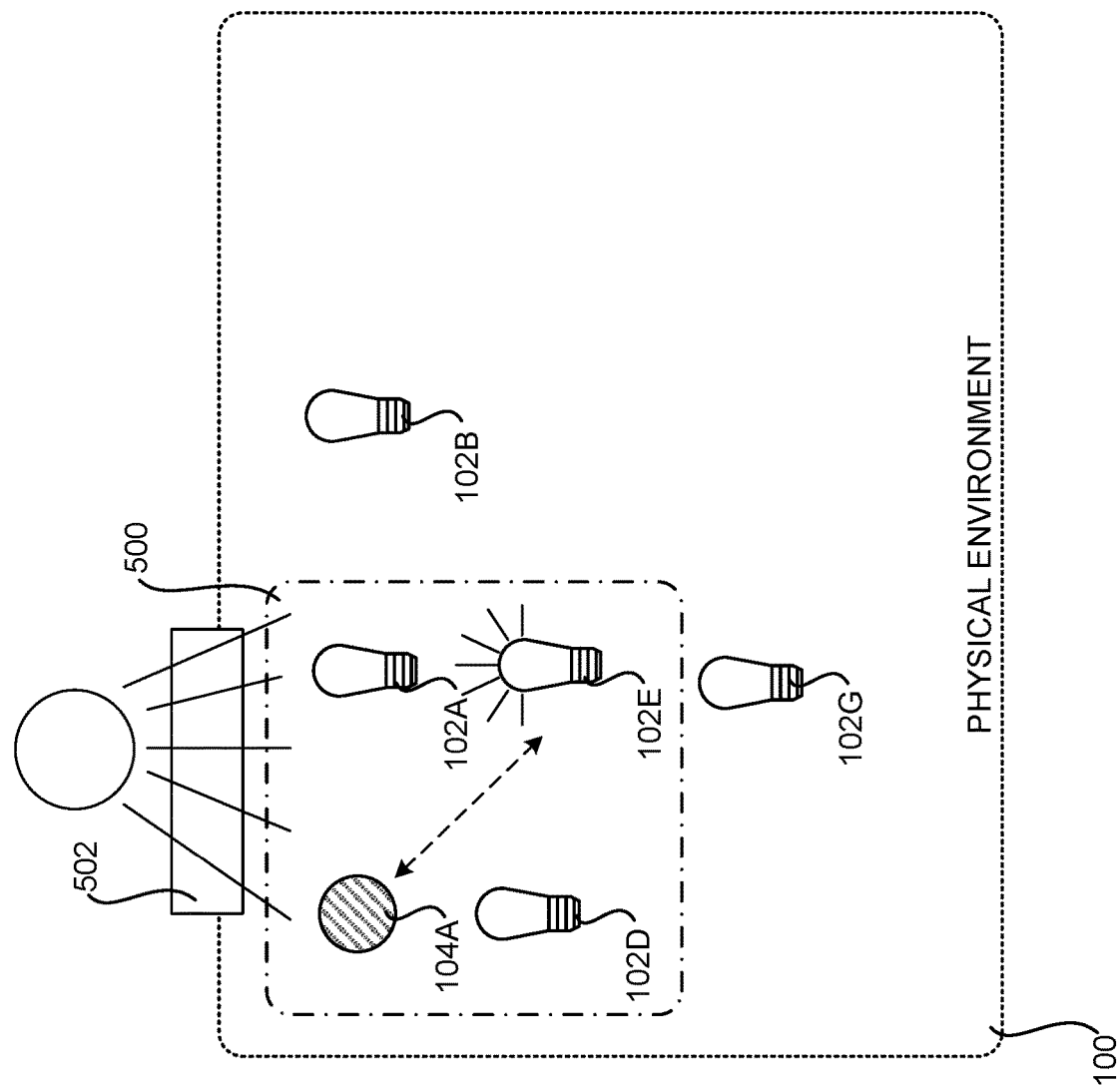

After the primary controller 106A receives the data from the sensor 104A, it determines if the desired condition has been achieved. If so, the primary controller 106A can stop activating IoT devices 102 in the environment 100. If, however, the desired condition in the physical environment 100 has not been achieved, the primary controller 106A selects another IoT device 102 in the environment 100 and activates the device 102 after a random or deterministic delay period has expired. In the illustrated example, the primary controller 106A has selected the IoT device 102D and caused the device to turn on following a random delay after turning on the IoT device 102A. This is illustrated in FIG. 5B. In some embodiments, the optimal delay period is identified using machine learning. The delay period might also be modified based upon environmental or other factors.

Following the activation of the IoT device 102D, the primary controller 106A takes a reading can be taken from the sensor 104A associated with the IoT device 102D. If the desired condition in the physical environment 100 has not been achieved, the primary controller selects another IoT device 102 in the environment 100 and activates the device after a delay period. In the illustrated example, the primary controller 106A selects the IoT device 102G and activates the device. Another reading is then taken from the sensor 104A. This process continues until the desired condition has been achieved in the physical environment 100.

It is to be appreciated that the process described above can also be repeated periodically to account for changing environmental conditions in an environment 100. For instance, in the example shown in FIGS. 5D and 5E, the owner of the physical environment 100 has also defined a job indicating that a minimum level of light is to be maintained during the day in the portion 500 of the physical environment 100, even considering sunlight entering the physical environment 100 through the skylight 502.

In order to achieve the desired condition in the physical environment 100 during daylight hours, the primary controller 106A periodically executes the job described above. During execution of the job, the primary controller 106A will select one of the IoT devices 102A, 102D, or 102E in the region 500 of the physical environment 100 to be illuminated. In this example the primary controller has selected the IoT device 102E and activated the device. In turn, the primary controller 106A has also received data from the sensor 104A associated with the IoT device 102E indicating the detected amount of light, including the light coming in the skylight 502.

Figure 5E:
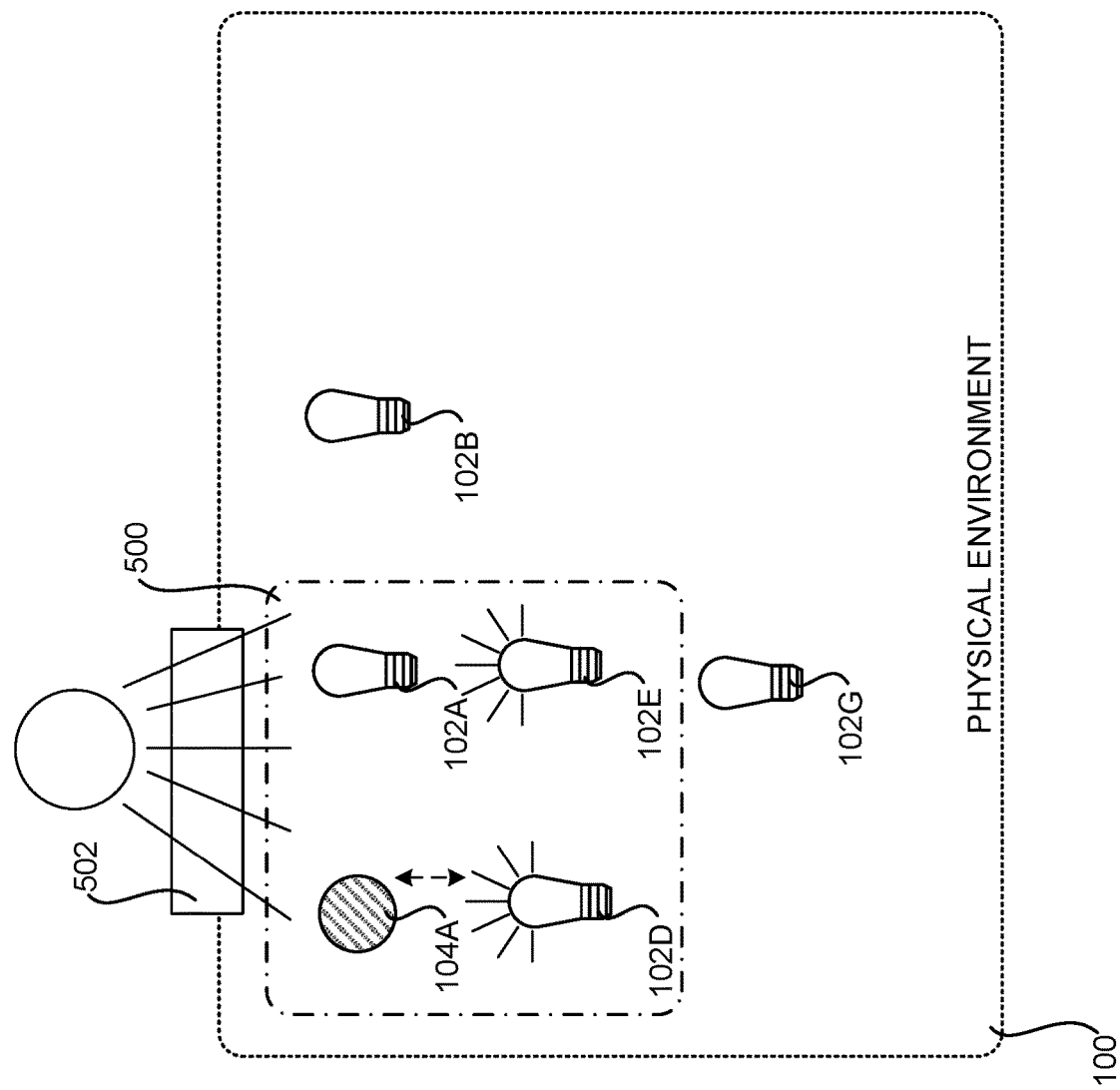

Because activation of the IoT device 102E has not resulted in the desired condition in the environment 100, the primary controller 106A has selected another IoT device 102D in the environment 100 and activated the device 102D following a delay period after the activation of the device 102E. This is illustrated in FIG. 5E.

Following activation of the IoT device 102D, the primary controller 106A receives data from the sensor 104A indicating the amount of light detected in the environment 100. Because the amount of detected light satisfies the desired condition in the environment 100, the primary controller 106A discontinues activating devices in the manner described above. This process might be periodically repeated based upon detected changes in the environment 100, on a pre-defined schedule, or based upon other triggers.

It is to be appreciated that while the example described above is presented in the context of activating IoT-enabled lightbulbs to create a desired level of lighting in an environment, the process described above can also be used to obtain a desired condition in a physical environment other than a level of light. For instance, IoT-enabled thermostats and dehumidifiers can be used in conjunction with temperature sensors or humidity sensors, respectively, to achieve a desired temperature or humidity in an environment.

Figure 6:
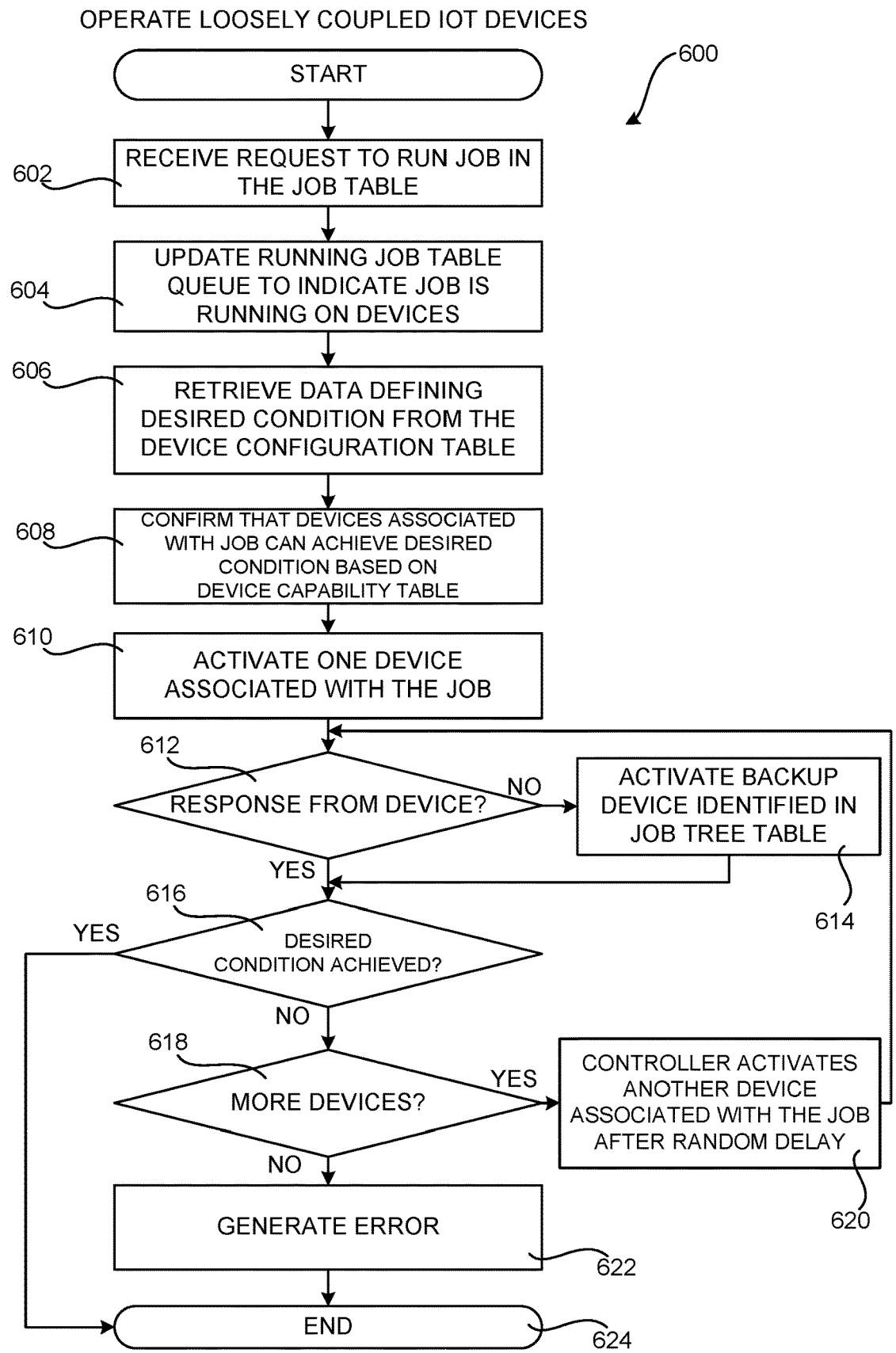
FIG. 6 is a flow diagram showing a routine that illustrates aspects of one mechanism disclosed herein for managing the conditions in a physical environment using loosely coupled IoT devices and environmental sensors, according to one embodiment.

FIG. 6 is a flow diagram showing a routine that illustrates aspects of one mechanism disclosed herein for managing the conditions in a physical environment 100 using loosely coupled IoT devices 102 and environmental sensors 104, according to one embodiment. The routine 600 begins at operation 602, where the primary controller 106A receives a request to execute a job that was previously defined in the job table 110. The request might be generated manually or might be triggered by another component such as, for example, an automated process that periodically runs jobs.

From operation 602, the routine 600 proceeds to operation 604, where the primary controller 106A updates the running job queue table 120 to indicate that the job is running on the IoT devices 102 associated with the job. The routine 600 then proceeds from operation 604 to operation 606, where the primary controller 106A retrieves data defining the desired condition in the physical environment 100 from the device configuration table 116. For example, the data might describe the level of light, temperature, or humidity that is desired in an environment 100.

From operation 606, the routine 600 proceeds to operation 608, where the primary controller 106A attempts to confirm that the IoT devices 102 associated with the current job can achieve the desired condition in the physical environment based upon their capabilities as defined in the device capability table 114. If the devices 102 associated with the current job have the proper capabilities, the routine 600 proceeds from operation 608 to operation 610, where the primary controller 106A selects and activates one IoT device 102 associated with the current job. As discussed above, the device 102 is randomly selected in some embodiments. In other embodiments, the device 102 can be selected based on other properties such as, but not limited to, the power consumption of the device 102. In this way, devices 102 might be activated in order from least to most power consumption.

From operation 610, the routine 600 proceeds to operation 612, where the primary controller 106A determines whether a response was received from the device 102 that was activated at operation 610. If no response is received from the device 102, the routine 600 proceeds from operation 612 to operation 614. At operation 614, the primary controller 106A selects and activates a backup device 102 for the non-responsive device using the job tree table 112 described above.

From operation 614, the routine 600 proceeds to operation 616, where the primary controller 106A obtains data from the sensor 104, or sensors 104, associated with the activated device 102. Based upon the received data, the primary controller 106A determines whether the desired condition in the environment 100 has been achieved following activation of the device 102.

If the desired condition has not yet been achieved, the routine 600 proceeds from operation 616 to operation 618, where the primary controller 106A determines if more IoT devices 102 are associated with the job based on the contents of the job table 110. If no additional IoT devices 102 are available and the desired condition has not yet been met, the routine 600 proceeds to operation 622, where an error message might be generated. The routine 600 then proceeds from operation 622 to operation 624, where it ends.

If, however, additional IoT devices 102 are available, the routine 600 proceeds from operation 618 to operation 620, where the controller 106A selects another device 102 associated with the job and activates the selected device 102 after the expiration of a random or pre-defined delay period following the activation of the previous IoT device 102. The routine 600 then proceeds from operation 620 back to operation 612, where the operations described above are repeated. Once the desired condition has been achieved in the environment 100, the routine 600 proceeds from operation 616 to operation 624, where it ends.

Figure 7:
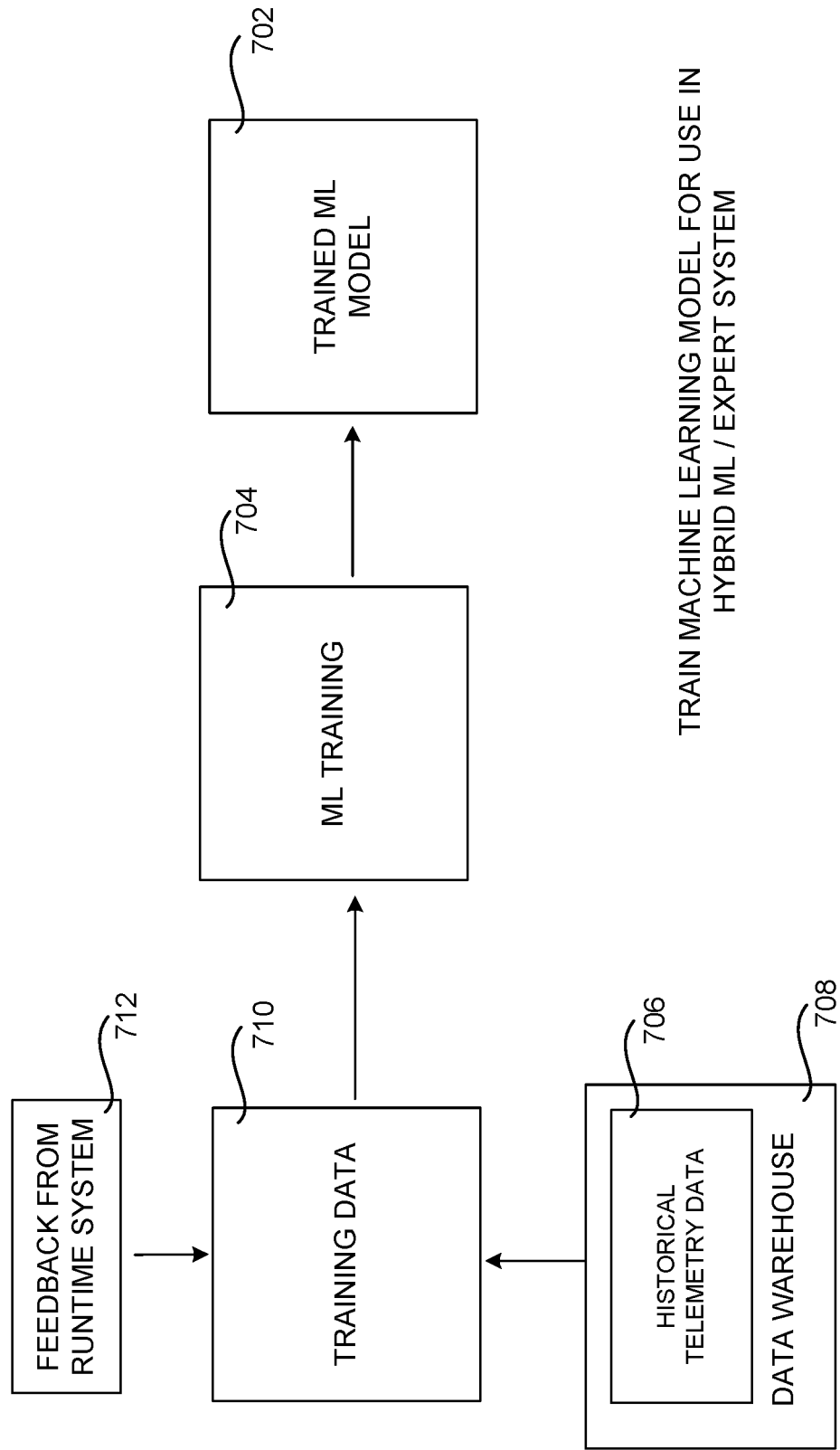
FIG. 7 is a software architecture diagram showing aspects of one mechanism disclosed herein for training a machine learning model for use in a hybrid machine learning/expert system for activating IoT devices in an environment to achieve a desired condition, according to one embodiment disclosed herein.

Hybrid Machine Learning/Expert System for Provisioning IoT Devices in an Environment to Achieve a Desired Condition FIG. 7 is a software architecture diagram showing aspects of one mechanism disclosed herein for training a machine learning model 702 for use in a hybrid ML/expert system for provisioning IoT devices 102 in an environment 100 to achieve a desired condition, or conditions, according to one embodiment disclosed herein. As described briefly above, the machine learning model 702 can be trained to generate initial provisioning settings that define a set of the IoT devices 102 in the environment 100 which, when activated, will achieve a desired condition, or conditions, in the environment 100. For example, the ML model 702 might be trained to generate initial provisioning settings that specify a set of IoT-enabled lightbulbs which, when enabled, will provide a desired level of light in a particular portion of a warehouse.

The initial provisioning settings generated by the ML model 702 can identify the devices 102 to be activated and, potentially, operational parameters (e.g. an output level (e.g. brightness)) for the IoT devices 102. Initial provisioning settings might also specify other data such as, for example, the order in which the IoT devices 102 are to be activated, a time of day at which the IoT devices 102 are to be activated, conditions under which the IoT devices 102 are to be activated, or a delay period following the activation of each of the IoT devices 102.

In order to train the ML model 702, training data 710 is first obtained. In one embodiment, historical telemetry data 706 stored in a data warehouse 708 or another location is utilized as the training data 710. The historical telemetry data 706 is telemetry data that is generated by the IoT devices 102 in the environment 100. The telemetry data can include, but is not limited to, data describing aspects of the operation of the IoT devices 102 over time. For example, telemetry data 706 might describe power consumption, processor utilization, memory utilization, network utilization, or other operational parameters of the IoT devices 102 over time. The IoT devices 102 can periodically report the telemetry data 706 to the primary controller 106A over time.

In some embodiments, a mechanism similar to that described above with regard to FIGS. 3A-4 can be utilized to collect telemetry data 706 for use in training the machine learning model 702. For example, a subset of the IoT devices 102 in an environment 100 can be turned activated and telemetry data can be collected from the devices 102. Subsequently, other devices 102 can be activated and telemetry data 106 collected from those devices 102. This process can be repeated for different combinations of IoT devices 102 in an environment.

Figure 8:
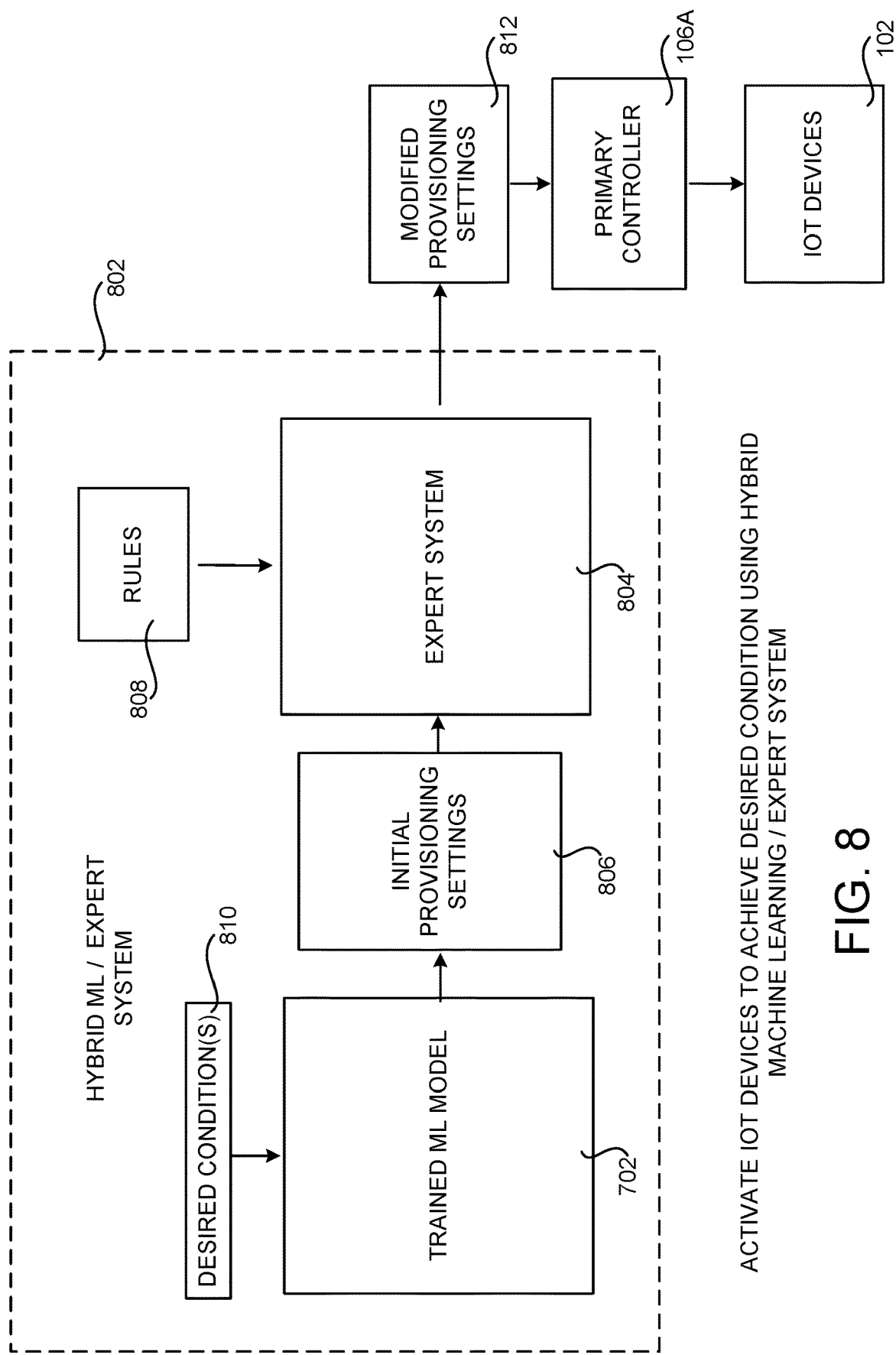
FIG. 8 is a software architecture diagram showing aspects of the operation of a hybrid machine learning/expert system for activating IoT devices in an environment to achieve a desired condition, according to one embodiment disclosed herein.

As shown in FIG. 7, feedback 712 from the hybrid ML/expert system shown in FIG. 8 can also be utilized as training data 710. In particular, and as discussed in greater detail below, the hybrid ML/expert system shown in FIG. 8 can select a set of IoT devices 102 in an environment 100 to achieve a desired condition (e.g. level of illumination). If the selected devices do not actually result in the desired condition, feedback 712 can be provided in the form of training data 710 that can be utilized during future iterations of training to improve the accuracy of the ML model 702. Training data 710 can be obtained from other sources in other embodiments. The training data 710 can also include prior provisioning information that defines the manner in which IoT devices in environments similar to the environment 100 were provisioned. Similar environments can include, but are not limited to, environments of similar size or layout or environments having similar IoT devices.

Once the training data 710 has been obtained, ML training 704 can be utilized to generate the trained ML model 702. ML training can include various types of machine learning including, but not limited to, supervised or unsupervised machine learning, reinforcement learning, self-learning, feature learning, sparse dictionary learning, anomaly detection, or association rules. Accordingly, the ML model 702 can be implemented as one or more of artificial neural networks, decision trees, support vector machines, regression analysis, Bayesian networks, or genetic algorithms. Other machine learning techniques known to those skilled in the art can also be utilized in other embodiments.

Once it has been trained, the trained machine learning model 702 can be used in a hybrid ML/expert system to provision the IoT devices 102 in an environment 100 to achieve a desired condition in an optimized manner. Details regarding the configuration and operation of such a hybrid ML/expert system will be provided below with regard to FIGS. 8 and 9.

FIG. 8 is a software architecture diagram showing aspects of the operation of a hybrid ML/expert system 802 for provisioning IoT devices 102 in an environment 100 to achieve a desired condition, or conditions, according to one embodiment disclosed herein. As shown in FIG. 8, the hybrid ML/expert system 802 includes the trained machine learning model 702 and an expert system 802.

As discussed above with regard to FIG. 7, the machine learning model 702 can be trained to generate initial provisioning settings 806 that identify a set of the IoT devices 102 in the environment 100 which, when activated, will achieve a desired condition, or conditions, in the environment 100. For example, the machine learning model 702 might be trained to predict a set of IoT-enabled lightbulbs which, when enabled, will provide a desired level of light in a particular portion of a warehouse. Data 810 can be input to the machine learning model 702 that identifies the desired condition.

In order to improve the accuracy of the machine learning model 702, the initial provisioning settings 806 generated by the machine learning model 702 can be modified by the expert system 804 to generate modified provisioning settings 812 in some embodiments. The expert system 804 is a computer program that emulates the decision-making ability of a human expert based upon a defined body of knowledge. The body of knowledge is represented in some embodiments as if-then rules 808 rather than through procedural code. In some embodiments, the expert system 804 is divided into two subsystems: a knowledgebase that represents facts and the rules 808 and an inference engine that applies the rules 808. Other configurations can be used in other embodiments.

The expert system 804 applies the rules 808 to initial provisioning settings 806 made by the trained ML model 702 to generate a modified provisioning settings 812. The rules 808 that the expert system 804 applies to a set of IoT devices 102 predicted by the ML model 702 can include, but are not limited to, rules 808 configured to add an IoT device 102 to the set of IoT devices 102 predicted by the ML model 702, rules 808 configured to remove an IoT device 102 from the set of IoT devices 102 predicted by the ML model 702, rules 808 configured to increase or decrease an output for an IoT device 102 in the set of IoT devices 102 predicted by the ML model 702, rules 808 specifying a minimum output or a maximum output for an IoT device 102 in the set of IoT devices 102 predicted by the ML model 702, rules for specifying a time at which the IoT devices 102 are to be activated, or rules specifying one or more conditions under which the IoT devices 102 are to be activated.

The rules 804 can be specific to the environment 100. For example, the rules 804 might reflect known conditions in the environment 100, known peculiarities of the environment 100, or other attributes specific to the environment 100. The expert system 804 can apply other types of rules 808 to initial provisioning settings 806 output by the ML model 702 to generate modified predictions 812 in other configurations.

Once the expert system 804 has generated the modified provisioning settings 812, the modified provisioning settings 812 can be provided to the primary controller 106A. The primary controller 106A can then utilize the modified provisioning settings 812 to activate the IoT devices 102 specified by the modified provisioning settings 812 to achieve the desired condition, or conditions, in the environment 100. In one embodiment, the primary controller 106A activates the IoT devices 102 identified by the modified provisioning settings 812 in the manner described above with regard to FIGS. 5A-6. The IoT devices 102 identified by a modified provisioning settings 812 can be activated in other ways in other configurations.

Figure 9:
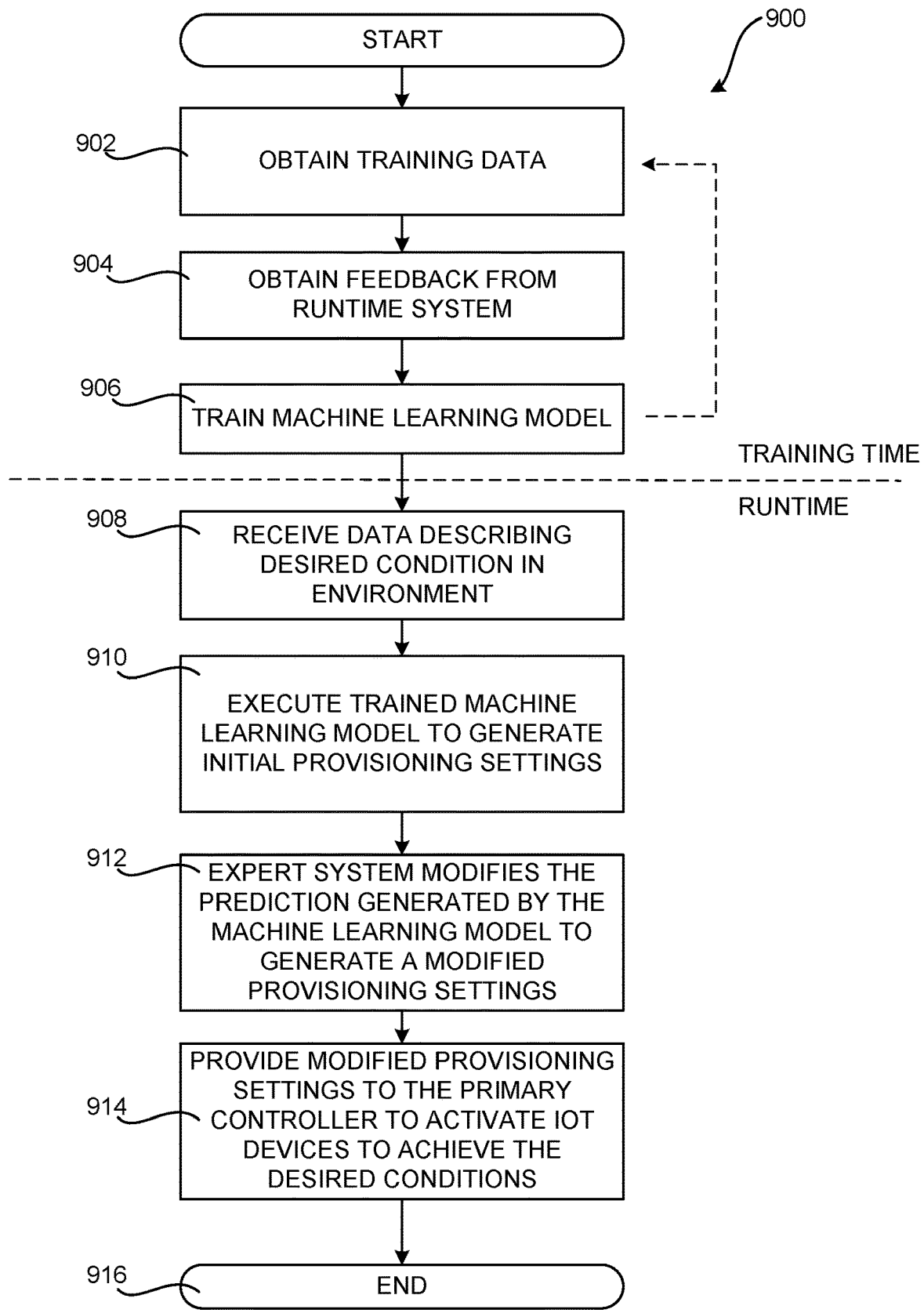
FIG. 9 is a flow diagram showing a routine that illustrates aspects of the training and operation of the hybrid machine learning/expert system shown in FIGS. 7 and 8, according to one embodiment disclosed herein.

FIG. 9 is a flow diagram showing a routine 900 that illustrates aspects of the training and operation of the hybrid machine learning/expert system 802 described above with regard to FIGS. 7 and 8, according to one embodiment disclosed herein. The routine 900 begins at operation 902, where the training data 710 is obtained such as, for example, by retrieving telemetry data 706 generated by the IoT devices 102 from a data warehouse 708 or another location.

From operation 902, the routine 900 proceeds to operation 904, where additional training data 710 might be obtained in the form of feedback from the hybrid ML/expert system 802, or might be obtained in another manner. As discussed above, the training data 710 can include information collected from the IoT devices 102 in the environment 100 and/or prior provisioning information collected from IoT devices 102 in environments similar to the environment 100. Once the training data 710 has been obtained, ML training 704 can be performed using the training data 710 to generate the machine learning model 702.

From operation 906, the routine 900 proceeds to operation 908, where data 810 is received that describes a desired condition, or conditions, in an environment (e.g. level of light, temperature, or humidity). The routine 900 then proceeds from operation 908 to operation 910, where the data 810 is used by the machine learning model 702 to generate initial provisioning settings 806 that identify a set of the IoT devices 102 in the environment 100 that are to be activated in order to achieve the desired condition, or conditions.

From operation 910, the routine 900 proceeds to operation 912, where the expert system takes the initial provisioning settings 806 generated by the machine learning model 702 and applies rules 808 to the initial provisioning settings 806 to generate modified provisioning settings 812. As discussed above, application of the rules 808 might result in IoT devices 102 being added to or removed from the initial provisioning settings 806, output levels for IoT devices 102 being modified, or other types of changes to the initial provisioning settings 806.

From operation 912, the routine 900 proceeds to operation 914, where the modified provisioning settings 812 are provided to the primary controller 106A. The primary controller 106A, in turn, activates the IoT devices 102 using the modified provisioning settings 812 in order to achieve the desired condition, or conditions, in the environment 100. The routine 900 then proceeds from operation 914 to operation 916, where it ends.

Figure 10:
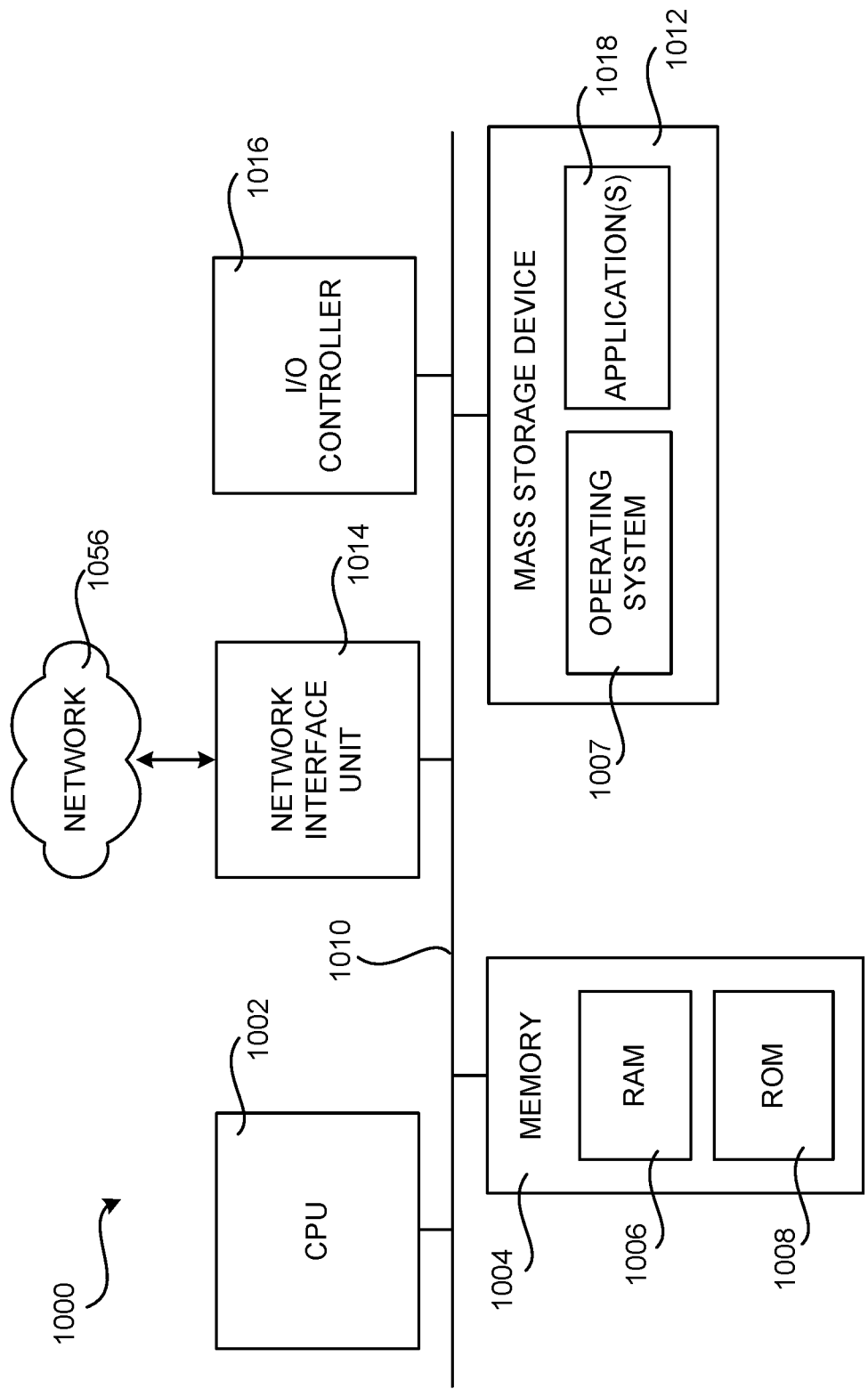
FIG. 10 is a computer architecture diagram illustrating an illustrative computer hardware and software architecture for a computing system capable of implementing aspects of the technologies presented herein.

FIG. 10 shows additional details of an example computer architecture 1000 for a computer capable of executing the program components described herein. Thus, the computer architecture 1000 illustrated in FIG. 10 illustrates an architecture for a server computer, smartphone, a desktop computer, a tablet computer, an on-board computer, and/or a laptop computer. The computer architecture 1000 can also be utilized to implement IoT devices 102 such as, but not limited to, but are not limited to, connected security systems, thermostats, cars, electronic appliances, lights in household and commercial environments, alarm clocks, speaker systems, vending machines, voice-driven devices, and others. The computer architecture 1000 might be utilized to execute any aspects of the software components presented herein.

The computer architecture 1000 illustrated in FIG. 10 includes a central processing unit 1002 ("CPU"), a system memory 1004, including a random access memory 1006 ("RAM") and a read-only memory ("ROM") 1008, and a system bus 1010 that couples the memory 1004 to the CPU 1002. A firmware containing the basic routines that help to transfer information between elements within the computer architecture 1000, such as during startup, can be stored in the ROM 1008. The computer architecture 1000 further includes a mass storage device 1012 for storing an operating system 1007, data, and one or more application programs 1018.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes the claims, the phrase "computer storage medium," "computer-readable storage medium" and variations thereof, does not include waves, signals, and/or other transitory and/or intangible communication media, per se.

According to various configurations, the computer architecture 1000 might operate in a networked environment using logical connections to remote computers through the network 1056 (discussed below with regard to FIG. 11) and/or another network or networks. A computing device implementing the computer architecture 1000 might connect to the network 1056 through a network interface unit 1014 connected to the bus 1010. It should be appreciated that the network interface unit 1014 also might be utilized to connect to other types of networks and remote computer systems. The computer architecture 1000 also might include an input/output controller 1016 for receiving and processing input from a number of other devices, including a keyboard, mouse, or electronic stylus (not shown in FIG. 10). Similarly, the input/output controller 1016 might provide output to a display screen, a printer, or other type of output device (also not shown in FIG. 10).

It should be appreciated that the software components described herein might, when loaded into the CPU 1002 and executed, transform the CPU 1002 and the overall computer architecture 1000 from a general-purpose computing system into a special-purpose computing system customized to facilitate the functionality presented herein. The CPU 1002 might be constructed from any number of transistors or other discrete circuit elements, which might individually or collectively assume any number of states. More specifically, the CPU 1002 might operate as a finite-state machine, in response to executable instructions contained within the software modules disclosed herein. These computer-executable instructions might transform the CPU 1002 by specifying how the CPU 1002 transitions between states, thereby transforming the transistors or other discrete hardware elements constituting the CPU 1002.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. For example, if the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software also might transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of particular locations within given magnetic media. These transformations also might include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 might include other types of computing devices, including hand-held computers, embedded computer systems, personal digital assistants, and other types of computing devices known to those skilled in the art. It is also contemplated that the computer architecture 1000 might not include all of the components shown in FIG. 10, might include other components that are not explicitly shown in FIG. 10, or might utilize an architecture completely different than that shown in FIG. 10.

Figure 11:
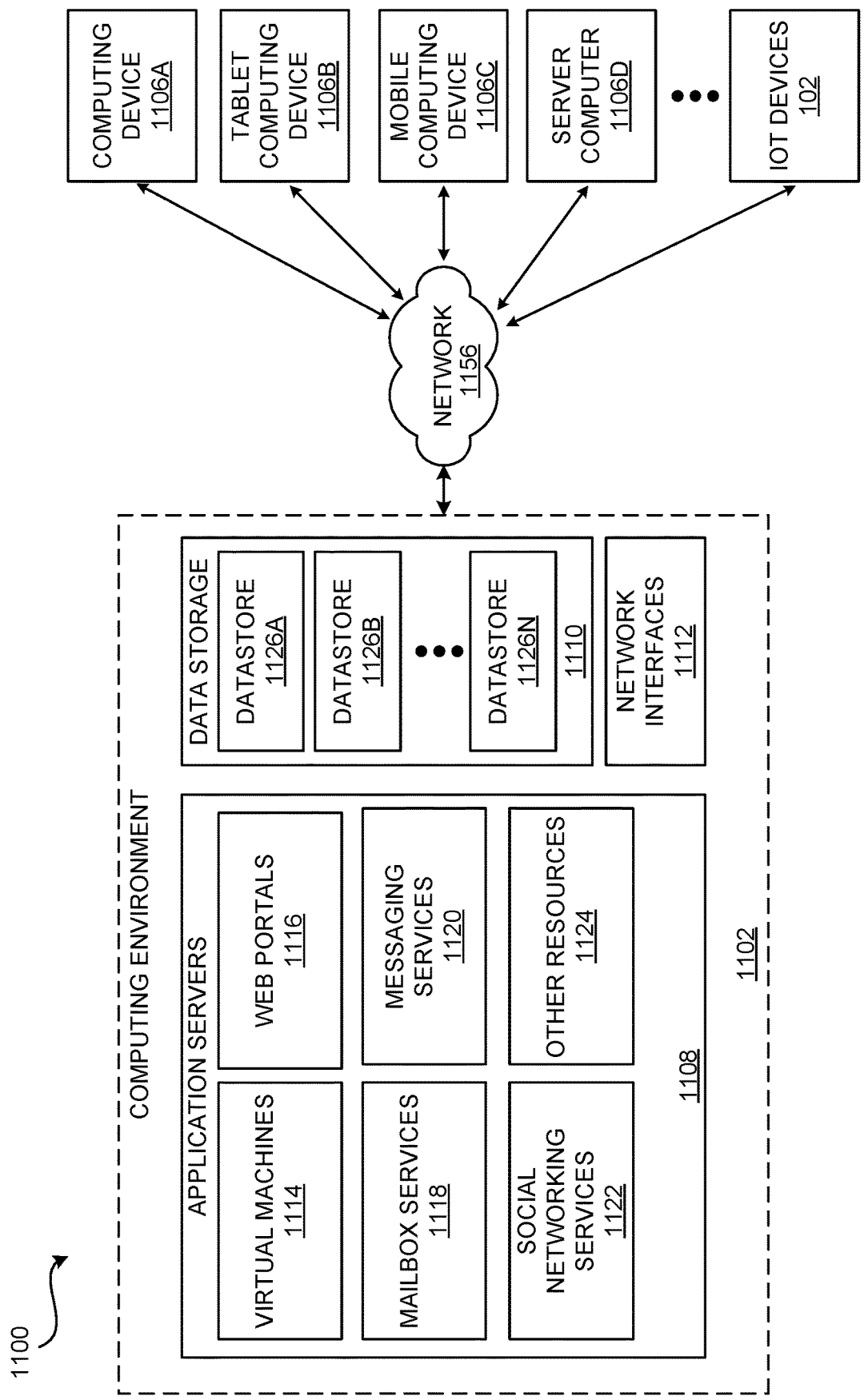
FIG. 11 is a network diagram illustrating an illustrative distributed computing environment capable of implementing aspects of the technologies presented herein.

FIG. 11 depicts an illustrative distributed computing environment 1100 capable of executing the software components presented herein. According to various implementations, the distributed computing environment 1100 includes a computing environment 1102 operating on, in communication with, or as part of the network 1156. The network 1156 might be or might include the network 1056, described above. One or more client devices 1106A-1106N (hereinafter referred to collectively and/or generically as "clients 1106") can communicate with the computing environment 1102 via the network 1156 and/or other connections (not illustrated in FIG. 11).

In one illustrated configuration, the clients 1106 include a computing device 1106A such as a laptop computer, a desktop computer, or other computing device; a tablet computing device ("tablet computing device") 1106B; a mobile computing device 1106C such as a smartphone, an on-board computer, or other mobile computing device; a server computer 1106D; and/or the IoT devices 102 described above. It should be understood that any number of devices 1106 can communicate with the computing environment 1102. Two example computing architectures for the devices 1106 are illustrated and described herein with reference to FIGS. 10 and 12. It should be understood that the illustrated devices 1106 and computing architectures illustrated and described herein are illustrative only, and should not be construed as being limited in any way.

In the illustrated configuration, the computing environment 1102 includes application servers 1108, data storage 1110, and one or more network interfaces 1112. According to various implementations, the functionality of the application servers 1108 can be provided by one or more server computers that are executing as part of, or in communication with, the network 1156. The application servers 1108 can host various services, virtual machines, portals, and/or other resources. The application servers 1108 can also host network services and other components for implementing the services provider network 106 described above.

In the illustrated configuration, the application servers 1108 host one or more virtual machines 1114 for hosting applications, network services, or for providing other functionality. According to various implementations, the virtual machines 1114 host one or more applications and/or software modules for providing the functionality described above with regard to FIGS. 1-9. It should be understood that this configuration is illustrative only, and should not be construed as being limiting in any way. The application servers 1108 can also host or provide access to one or more portals, link pages, web sites, network services, and/or other information ("web portals") 1116.

According to various implementations, the application servers 1108 also include one or more mailbox services 1118 and one or more messaging services 1120. The mailbox services 1118 can include electronic mail ("email") services. The mailbox services 1118 also can include various personal information management ("PIM") services including, but not limited to, calendar services, contact management services, collaboration services, and/or other services. The messaging services 1120 can include, but are not limited to, instant messaging services, chat services, forum services, and/or other communication services.

The application servers 1108 also might include one or more social networking services 1122. The social networking services 1122 can include various social networking services including, but not limited to, services for sharing or posting status updates, instant messages, links, photos, videos, and/or other information; services for commenting or displaying interest in articles, products, blogs, or other resources; and/or other services. Other services are possible and are contemplated. The social networking services 1122 also can include commenting, blogging, and/or micro blogging services. Other services are possible and are contemplated. As shown in FIG. 11, the application servers 1108 also can host other network services, applications, portals, and/or other resources ("other resources") 1124. The other resources 1124 can include, but are not limited to, document sharing, rendering, or any other functionality.

As mentioned above, the computing environment 1102 can include data storage 1110. According to various implementations, the functionality of the data storage 1110 is provided by one or more databases operating on, or in communication with, the network 1156. The functionality of the data storage 1110 also can be provided by one or more server computers configured to host data for the computing environment 1102. The data storage 1110 can include, host, or provide one or more real or virtual data stores 1126A-1126N (hereinafter referred to collectively and/or generically as "datastores 1126").

The datastores 1126 are configured to host data used or created by the application servers 1108 and/or other data. Although not illustrated in FIG. 11, the datastores 1126 also can host or store web page documents, word processing documents, presentation documents, data structures, and/or other data utilized by any application program or another module, such as that described above with regard to FIG. 1. Aspects of the datastores 1126 might be associated with a service for storing files.

The computing environment 1102 can communicate with, or be accessed by, the network interfaces 1112. The network interfaces 1112 can include various types of network hardware and software for supporting communications between two or more computing devices including, but not limited to, the clients 1106 and the application servers 1108. It should be appreciated that the network interfaces 1112 also might be utilized to connect to other types of networks and/or computer systems.

It should be understood that the distributed computing environment 1100 described herein can implement aspects of at least some of the software elements described herein with any number of virtual computing resources and/or other distributed computing functionality that can be configured to execute any aspects of the software components disclosed herein.

Figure 12:
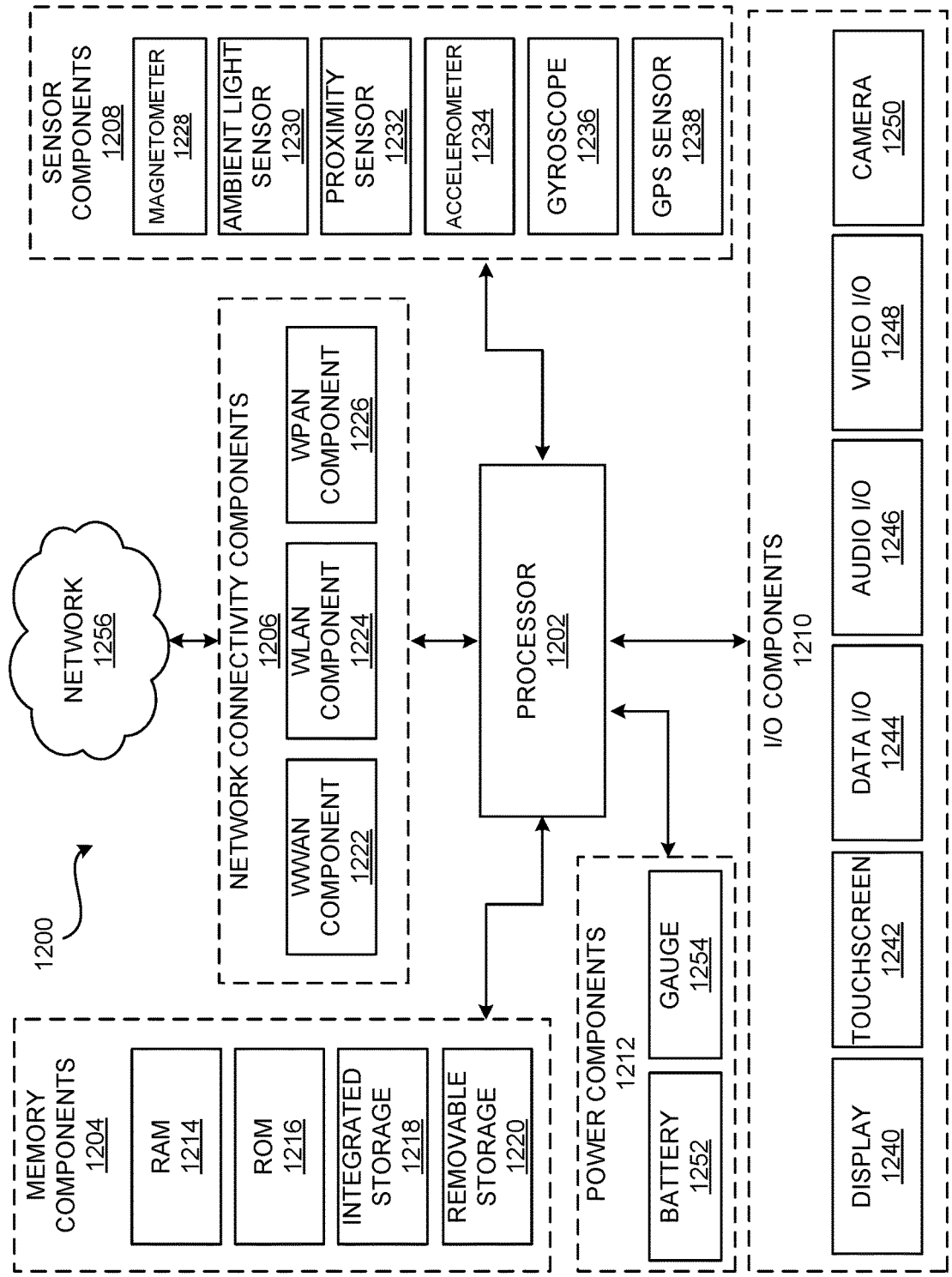
FIG. 12 is a computer architecture diagram illustrating a computing device architecture for a computing device capable of implementing aspects of the technologies presented herein.

Turning now to FIG. 12, an illustrative computing device architecture 1200 for a computing device that is capable of executing the software components described herein will be discussed. The computing device architecture 1200 is applicable to computing devices that facilitate mobile computing due, in part, to form factor, wireless connectivity, and/or battery-powered operation. The computing device architecture 1200 is also applicable to the IoT devices 102.

The computing device architecture 1200 is applicable to any of the clients 1106 shown in FIG. 11, including the IoT devices 102. Moreover, aspects of the computing device architecture 1200 might be applicable to traditional desktop computers, portable computers (e.g., laptops, notebooks, ultra-portables, and netbooks), server computers, and other computer systems.

The computing device architecture 1200 illustrated in FIG. 12 includes a processor 1202, memory components 1204, network connectivity components 1206, sensor components 1208, input/output components 1210, and power components 1212. In the illustrated configuration, the processor 1202 is in communication with the memory components 1204, the network connectivity components 1206, the sensor components 1208, the input/output ("I/O") components 1210, and the power components 1212. Although no connections are shown between the individual components illustrated in FIG. 12, the components can interact to carry out device functions. In some configurations, the components are arranged so as to communicate via one or more hardware busses (not shown).

The processor 1202 includes a central processing unit ("CPU") configured to process data, execute computer-executable instructions of one or more application programs, and communicate with other components of the computing device architecture 1200 in order to perform various functionality described herein. The processor 1202 might be utilized to execute aspects of the software components presented herein and, particularly, software components for implementing the functionality provided by the IoT devices 102, the primary controller 106A, and the backup controller 106B.

In some configurations, the processor 1202 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, 4K, and higher resolution), video games, three-dimensional ("3D") modeling applications, and the like. In some configurations, the processor 1202 is configured to communicate with a discrete GPU (not shown). In any case, the CPU and GPU might be configured in accordance with a co-processing CPU/GPU computing model, wherein the sequential part of an application executes on the CPU and the computationally-intensive part is accelerated by the GPU.

In some configurations, the processor 1202 is, or is included in, a system-on-chip ("SoC") along with one or more of the other components described herein below. For example, the SoC might include the processor 1202, a GPU, one or more of the network connectivity components 1206, and one or more of the sensor components 1208. In some configurations, the processor 1202 is fabricated, in part, utilizing a package-on-package ("PoP") integrated circuit packaging technique. The processor 1202 might be a single core or multi-core processor.

The processor 1202 might implement an ARM architecture, available for license from ARM HOLDINGS of Cambridge, United Kingdom. Alternatively, the processor 1202 might implement an x86 architecture, such as is available from INTEL CORPORATION of Mountain View, Calif. and others. In some configurations, the processor 1202 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1204 include a RAM 1214, a ROM 1216, an integrated storage memory ("integrated storage") 1218, and a removable storage memory ("removable storage") 1220. In some configurations, the RAM 1214 or a portion thereof, the ROM 1216 or a portion thereof, and/or some combination of the RAM 1214 and the ROM 1216 is integrated in the processor 1202. In some configurations, the ROM 1216 is configured to store a firmware, an operating system or a portion thereof (e.g., operating system kernel), and/or a bootloader to load an operating system kernel from the integrated storage 1218 and/or the removable storage 1220. The firmware can implement operations performed by the IoT devices 102 described above. Certain operations can be performed when the IoT devices 102 are powered on or perform a warm reset.

The integrated storage 1218 can include a solid-state memory, a hard disk, or a combination of solid-state memory and a hard disk. The integrated storage 1218 might be soldered or otherwise connected to a logic board upon which the processor 1202 and other components described herein also might be connected. As such, the integrated storage 1218 is integrated in the computing device. The integrated storage 1218 is configured to store an operating system or portions thereof, application programs, data, and other software components described herein.

The removable storage 1220 can include a solid-state memory, a hard disk, or a combination of solid-state memory and a hard disk. In some configurations, the removable storage 1220 is provided in lieu of the integrated storage 1218. In other configurations, the removable storage 1220 is provided as additional optional storage. In some configurations, the removable storage 1220 is logically combined with the integrated storage 1218 such that the total available storage is made available as a total combined storage capacity. In some configurations, the total combined capacity of the integrated storage 1218 and the removable storage 1220 is shown to a user instead of separate storage capacities for the integrated storage 1218 and the removable storage 1220.

The removable storage 1220 is configured to be inserted into a removable storage memory slot (not shown) or other mechanism by which the removable storage 1220 is inserted and secured to facilitate a connection over which the removable storage 1220 can communicate with other components of the computing device, such as the processor 1202. The removable storage 1220 might be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1204 can store an operating system. According to various configurations, the operating system includes, but is not limited to the WINDOWS operating system from MICROSOFT CORPORATION, IOS from APPLE INC. of Cupertino, Calif., and ANDROID OS from GOOGLE INC. of Mountain View, Calif. Other operating systems are contemplated.

The network connectivity components 1206 include a wireless wide area network component ("WWAN component") 1222, a wireless local area network component ("WLAN component") 1224, and a wireless personal area network component ("WPAN component") 1226. The network connectivity components 1206 facilitate communications to and from the network 1256 or another network, which might be a WWAN, a WLAN 104, or a WPAN. Although only the network 1256 is illustrated, the network connectivity components 1206 might facilitate simultaneous communication with multiple networks, including the network 1056 of FIG. 10. For example, the network connectivity components 1206 might facilitate simultaneous communications with multiple networks via one or more of a WWAN, a WLAN, or a WPAN. The network 1256 might also be or might include a WWAN, such as a mobile telecommunications network utilizing one or more mobile telecommunications technologies to provide voice and/or data services to a computing device utilizing the computing device architecture 1200 via the WWAN component 1222.

In some configurations, the WWAN component 1222 is configured to provide dual-multi-mode connectivity to the network 1256. For example, the WWAN component 1222 might be configured to provide connectivity to the network 1256, wherein the network 1256 provides service via GSM and UMTS technologies, or via some other combination of technologies. Alternatively, multiple WWAN components 1222 might be utilized to perform such functionality, and/or provide additional functionality to support other non-compatible technologies (i.e., incapable of being supported by a single WWAN component). The WWAN component 1222 might facilitate similar connectivity to multiple networks (e.g., a UMTS network and an LTE network).

The network 1256 might be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1224 is configured to connect to the network 1256 via the WI-FI access points. Such connections might be secured via various encryption technologies including, but not limited to, WI-FI Protected Access ("WPA"), WPA2, Wired Equivalent Privacy ("WEP"), and the like.

The network 1256 might be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1226 is configured to facilitate communications with other devices, such as peripherals, computers, or other computing devices via the WPAN.

The sensor components 1208 include a magnetometer 1228, an ambient light sensor 1230, a proximity sensor 1232, an accelerometer 1234, a gyroscope 1236, and a Global Positioning System sensor ("GPS sensor") 1238. It is contemplated that other sensors, such as, but not limited to, temperature sensors or shock detection sensors, also might be incorporated in the computing device architecture 1200.

The magnetometer 1228 is configured to measure the strength and direction of a magnetic field. In some configurations the magnetometer 1228 provides measurements to a compass application program stored within one of the memory components 1204 in order to provide a user with accurate directions in a frame of reference including the cardinal directions, north, south, east, and west. Similar measurements might be provided to a navigation application program that includes a compass component. Other uses of measurements obtained by the magnetometer 1228 are contemplated.

The ambient light sensor 1230 is configured to measure ambient light. In some configurations, the ambient light sensor 1230 provides measurements to an application program stored within one of the memory components 1204 in order to automatically adjust the brightness of a display (described below) to compensate for low-light and high-light environments. Other uses of measurements obtained by the ambient light sensor 1230 are contemplated.

The proximity sensor 1232 is configured to detect the presence of an object or thing in proximity to the computing device without direct contact. In some configurations, the proximity sensor 1232 detects the presence of a user's body (e.g., the user's face) and provides this information to an application program stored within one of the memory components 1204 that utilizes the proximity information to enable or disable some functionality of the computing device. For example, a telephone application program might automatically disable a touchscreen (described below) in response to receiving the proximity information so that the user's face does not inadvertently end a call or enable/disable other functionality within the telephone application program during the call. Other uses of proximity as detected by the proximity sensor 1232 are contemplated.

The accelerometer 1234 is configured to measure proper acceleration. In some configurations, output from the accelerometer 1234 is used by an application program as an input mechanism to control some functionality of the application program. For example, the application program might be a video game in which a character, a portion thereof, or an object is moved or otherwise manipulated in response to input received via the accelerometer 1234. In some configurations, output from the accelerometer 1234 is provided to an application program for use in switching between landscape and portrait modes, calculating coordinate acceleration, or detecting a fall. Other uses of the accelerometer 1234 are contemplated.

The gyroscope 1236 is configured to measure and maintain orientation. In some configurations, output from the gyroscope 1236 is used by an application program as an input mechanism to control some functionality of the application program. For example, the gyroscope 1236 can be used for accurate recognition of movement within a 3D environment of a video game application or some other application. In some configurations, an application program utilizes output from the gyroscope 1236 and the accelerometer 1234 to enhance control of some functionality of the application program. Other uses of the gyroscope 1236 are contemplated.

The GPS sensor 1238 is configured to receive signals from GPS satellites for use in calculating a location. The location calculated by the GPS sensor 1238 might be used by any application program that requires or benefits from location information. For example, the location calculated by the GPS sensor 1238 might be used with a navigation application program to provide directions from the location to a destination or directions from the destination to the location. Moreover, the GPS sensor 1238 might be used to provide location information to an external location-based service, such as E911 service. The GPS sensor 1238 might obtain location information generated via WI-FI, WIMAX, and/or cellular triangulation techniques utilizing one or more of the network connectivity components 1206 to aid the GPS sensor 1238 in obtaining a location fix. The GPS sensor 1238 might also be used in Assisted GPS ("A-GPS") systems.

The I/O components 1210 include a display 1240, a touchscreen 1242, a data I/O interface component ("data I/O") 1244, an audio I/O interface component ("audio I/O") 1246, a video I/O interface component ("video I/O") 1248, and a camera 1250. In some configurations, the display 1240 and the touchscreen 1242 are combined. In some configurations two or more of the data I/O component 1244, the audio I/O component 1246, and the video I/O component 1248 are combined. The I/O components 1210 might include discrete processors configured to support the various interfaces described below, or might include processing functionality built-in to the processor 1202.

The display 1240 is an output device configured to present information in a visual form. In particular, the display 1240 might present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1240 is a liquid crystal display ("LCD") utilizing any active or passive matrix technology and any backlighting technology (if used). In some configurations, the display 1240 is an organic light emitting diode ("OLED") display. Other display types are contemplated.

The touchscreen 1242, also referred to herein as a "touch-enabled screen," is an input device configured to detect the presence and location of a touch. The touchscreen 1242 might be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or might utilize any other touchscreen technology. In some configurations, the touchscreen 1242 is incorporated on top of the display 1240 as a transparent layer to enable a user to use one or more touches to interact with objects or other information presented on the display 1240. In other configurations, the touchscreen 1242 is a touch pad incorporated on a surface of the computing device that does not include the display 1240. For example, the computing device might have a touchscreen incorporated on top of the display 1240 and a touch pad on a surface opposite the display 1240.

In some configurations, the touchscreen 1242 is a single-touch touchscreen. In other configurations, the touchscreen 1242 is a multi-touch touchscreen. In some configurations, the touchscreen 1242 is configured to detect discrete touches, single touch gestures, and/or multi-touch gestures. These are collectively referred to herein as gestures for convenience. Several gestures will now be described. It should be understood that these gestures are illustrative only and are not intended to limit the scope of the appended claims. Moreover, the described gestures, additional gestures, and/or alternative gestures might be implemented in software for use with the touchscreen 1242. As such, a developer might create gestures that are specific to a particular application program.

In some configurations, the touchscreen 1242 supports a tap gesture in which a user taps the touchscreen 1242 once on an item presented on the display 1240. The tap gesture might be used for various reasons including, but not limited to, opening or launching whatever the user taps. In some configurations, the touchscreen 1242 supports a double tap gesture in which a user taps the touchscreen 1242 twice on an item presented on the display 1240. The double tap gesture might be used for various reasons including, but not limited to, zooming in or zooming out in stages. In some configurations, the touchscreen 1242 supports a tap and hold gesture in which a user taps the touchscreen 1242 and maintains contact for at least a pre-defined time. The tap and hold gesture might be used for various reasons including, but not limited to, opening a context-specific menu.

In some configurations, the touchscreen 1242 supports a pan gesture in which a user places a finger on the touchscreen 1242 and maintains contact with the touchscreen 1242 while moving the finger on the touchscreen 1242. The pan gesture might be used for various reasons including, but not limited to, moving through screens, images, or menus at a controlled rate. Multiple finger pan gestures are also contemplated. In some configurations, the touchscreen 1242 supports a flick gesture in which a user swipes a finger in the direction the user wants the screen to move. The flick gesture might be used for various reasons including, but not limited to, scrolling horizontally or vertically through menus or pages. In some configurations, the touchscreen 1242 supports a pinch and stretch gesture in which a user makes a pinching motion with two fingers (e.g., thumb and forefinger) on the touchscreen 1242 or moves the two fingers apart. The pinch and stretch gesture might be used for various reasons including, but not limited to, zooming gradually in or out of a web site, map, or picture.

Although the above gestures have been described with reference to the use one or more fingers for performing the gestures, other appendages such as toes or objects such as styluses might be used to interact with the touchscreen 1242. As such, the above gestures should be understood as being illustrative only and should not be construed as being limiting in any way.

The data I/O interface component 1244 is configured to facilitate input of data to the computing device and output of data from the computing device. In some configurations, the data I/O interface component 1244 includes a connector configured to provide wired connectivity between the computing device and a computer system, for example, for synchronization operation purposes. The connector might be a proprietary connector or a standardized connector such as USB, micro-USB, mini-USB, USB-C or the like. In some configurations, the connector is a dock connector for docking the computing device with another device such as a docking station, audio device (e.g., a digital music player), or video device.

The audio I/O interface component 1246 is configured to provide audio input and/or output capabilities to the computing device. In some configurations, the audio I/O interface component 1246 includes a microphone configured to collect audio signals. In some configurations, the audio I/O interface component 1246 includes a headphone jack configured to provide connectivity for headphones or other external speakers. In some configurations, the audio I/O interface component 1246 includes a speaker for the output of audio signals. In some configurations, the audio I/O interface component 1246 includes an optical audio cable out.

The video I/O interface component 1248 is configured to provide video input and/or output capabilities to the computing device. In some configurations, the video I/O interface component 1248 includes a video connector configured to receive video as input from another device (e.g., a video media player such as a DVD or BLURAY player) or send video as output to another device (e.g., a monitor, a television, or some other external display). In some configurations, the video I/O interface component 1248 includes a High-Definition Multimedia Interface ("HDMI"), mini-HDMI, micro-HDMI, DisplayPort, or proprietary connector to input/output video content. In some configurations, the video I/O interface component 1248 or portions thereof is combined with the audio I/O interface component 1246 or portions thereof. The device illustrated in FIG. 12 can also be headless (i.e. without a display).

The camera 1250 can be configured to capture still images and/or video. The camera 1250 might utilize a charge coupled device ("CCD") or a complementary metal oxide semiconductor ("CMOS") image sensor to capture images. In some configurations, the camera 1250 includes a flash to aid in taking pictures in low-light environments. Settings for the camera 1250 might be implemented as hardware or software buttons.

Although not illustrated, one or more hardware buttons might also be included in the computing device architecture 1200. The hardware buttons might be used for controlling some operational aspects of the computing device. The hardware buttons might be dedicated buttons or multi-use buttons. The hardware buttons might be mechanical or sensor-based.

The illustrated power components 1212 include one or more batteries 1252, which can be connected to a battery gauge 1254. The batteries 1252 might be rechargeable or disposable. Rechargeable battery types include, but are not limited to, lithium polymer, lithium ion, nickel cadmium, and nickel metal hydride. Each of the batteries 1252 might be made of one or more cells.

The battery gauge 1254 can be configured to measure battery parameters such as current, voltage, and temperature. In some configurations, the battery gauge 1254 is configured to measure the effect of a battery's discharge rate, temperature, age and other factors to predict remaining life within a certain percentage of error. In some configurations, the battery gauge 1254 provides measurements to an application program that is configured to utilize the measurements to present useful power management data to a user. Power management data might include one or more of a percentage of battery used, a percentage of battery remaining, a battery condition, a remaining time, a remaining capacity (e.g., in watt hours), a current draw, and a voltage.

The power components 1212 might also include a power connector, which might be combined with one or more of the aforementioned I/O components 1210. The power components 1212 might interface with an external power system or charging equipment via an I/O component.

It is to be appreciated that the computing architectures and networks shown in FIGS. 10-12 have been simplified for ease of discussion. It should also be appreciated that the disclosed computing architectures and networks can include and utilize more, less, different, or alternate computing components, devices, software programs, networking devices, and other components not specifically described herein.

The disclosure presented herein also encompasses the subject matter set forth in the following clauses:

Clause 1. A computer-implemented method performed by a computing device for provisioning Internet of things (IoT) devices in an environment to achieve a plurality of desired conditions without human interaction, the method comprising: generating initial provisioning settings based upon information collected from the IoT devices in the environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment; generating modified provisioning settings by applying a plurality of rules specific to the environment to the initial provisioning settings, the plurality of rules configured modify the initial provisioning settings by adding or removing IoT devices and modifying the operational parameters; and provisioning the IoT devices in the environment according to the modified provisioning settings to achieve the plurality of desired conditions without human interaction.

Clause 2. The computer-implemented method of clause 1, wherein the prior provisioning information is obtained by a machine learning (ML) model.

Clause 3. The computer-implemented method of any of clauses 1 or 2, wherein the plurality of rules specific to the environment are obtained from an expert system.

Clause 4. The computer-implemented method of any of clauses 1-3, wherein plurality of rules are further configured to modify the initial provisioning settings by specifying a time at which the plurality of IoT devices are to be activated.

Clause 5. The computer-implemented method of any of clauses 1-4, wherein plurality of rules are further configured to modify the initial provisioning settings by specifying one or more conditions under which the plurality of IoT devices are to be activated.

Clause 6. The computer-implemented method of any of clauses 1-5, wherein the one or more rules are configured to increase an output of at least one of the plurality of IoT devices in the environment or decrease an output of at least one of the plurality of IoT devices in the environment.

Clause 7. The computer-implemented method of any of clauses 1-6, wherein the one or more rules specify a minimum output for at least one of the plurality of IoT devices in the environment.

Clause 8. The computer-implemented method of any of clauses 1-7, wherein the one or more rules specify a maximum output for at least one of the plurality of IoT devices in the environment.

Clause 9. A computing device, comprising: a processor; and a computer-readable storage media having instructions stored thereupon which, when executed by the processor, cause the computing device to: generate initial provisioning settings based upon information collected from IoT devices in an environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment; generate modified provisioning settings by applying a plurality of rules specific to the environment to the initial provisioning settings, the plurality of rules configured modify the initial provisioning settings by adding or removing IoT devices and modifying the operational parameters; and provision the IoT devices in the environment according to the modified provisioning settings to achieve the plurality of desired conditions without human interaction.

Clause 10. The computing device of clause 9, wherein the prior provisioning information is obtained by a machine learning (ML) model.

Clause 11. The computing device of any of clauses 9 or 10, wherein plurality of rules are further configured to modify the initial provisioning settings by specifying a time at which the plurality of IoT devices are to be activated.

Clause 12. The computing device of any of clauses 9-11, wherein plurality of rules are further configured to modify the initial provisioning settings by specifying one or more conditions under which the plurality of IoT devices are to be activated.

Clause 13. The computing device of any of clauses 9-12, wherein plurality of rules are further configured to modify the initial provisioning settings by specifying one or more conditions under which the plurality of IoT devices are to be activated.

Clause 14. The computing device of any of clauses 9-13, wherein the one or more rules specify a minimum output for at least one of the plurality of IoT devices in the environment or a maximum output for at least one of the plurality of IoT devices in the environment.

Clause 15. A non-transitory computer-readable storage media having instructions stored thereupon which, when executed by a processor, cause a computing device to: generate initial provisioning settings based upon information collected from IoT devices in an environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment; generate modified provisioning settings by applying a plurality of rules specific to the environment to the initial provisioning settings, the plurality of rules configured modify the initial provisioning settings by adding or removing IoT devices and modifying the operational parameters; and provision the IoT devices in the environment according to the modified provisioning settings to achieve the plurality of desired conditions without human interaction.

Clause 16. The non-transitory computer-readable storage media of clause 15, wherein the prior provisioning information is obtained by a machine learning (ML) model.

Clause 17. The non-transitory computer-readable storage media of any of clauses 15 or 16, wherein plurality of rules are further configured to modify the initial provisioning settings by specifying a time at which the plurality of IoT devices are to be activated.

Clause 18. The non-transitory computer-readable storage media of any of clauses 15-17, wherein plurality of rules are further configured to modify the initial provisioning settings by specifying one or more conditions under which the plurality of IoT devices are to be activated.

Clause 19. The non-transitory computer-readable storage media of any of clauses 15-18, wherein plurality of rules are further configured to modify the initial provisioning settings by specifying one or more conditions under which the plurality of IoT devices are to be activated.

Clause 20. The non-transitory computer-readable storage media of any of clauses 15-19, wherein the one or more rules specify a minimum output for at least one of the plurality of IoT devices in the environment or a maximum output for at least one of the plurality of IoT devices in the environment.

Based on the foregoing, it should be appreciated that technologies have been disclosed herein for managing and operating loosely coupled IoT devices. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method performed by a computing device for provisioning Internet of things (IoT) devices in an environment to achieve a plurality of desired conditions without human interaction, the method comprising:

generating initial provisioning settings based upon information collected from the IoT devices in the environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment;

generating modified provisioning settings by applying a plurality of rules specific to the environment to the initial provisioning settings, the plurality of rules configured to modify the initial provisioning settings by adding or removing IoT devices and modifying the operational parameters; and provisioning the IoT devices in the environment according to the modified provisioning settings to achieve the plurality of desired conditions without human interaction.

2. The computer-implemented method of claim 1, wherein the prior provisioning information is obtained by a machine learning (ML) model.

3. The computer-implemented method of claim 1, wherein the plurality of rules specific to the environment are obtained from an expert system.

4. The computer-implemented method of claim 1, wherein the plurality of rules are further configured to modify the initial provisioning settings by specifying a time at which the plurality of IoT devices are to be activated.

5. The computer-implemented method of claim 1, wherein the plurality of rules are further configured to modify the initial provisioning settings by specifying one or more conditions under which the plurality of IoT devices are to be activated.

6. The computer-implemented method of claim 1, wherein the plurality of rules are configured to increase an output of at least one of the plurality of IoT devices in the environment or decrease an output of at least one of the plurality of IoT devices in the environment.

7. The computer-implemented method of claim 1, wherein the plurality of rules specify a minimum output for at least one of the plurality of IoT devices in the environment.

8. The computer-implemented method of claim 1, wherein the plurality of rules specify a maximum output for at least one of the plurality of IoT devices in the environment.

9. A computing device, comprising:

a processor; and a computer-readable storage media having instructions stored thereupon which, when executed by the processor, cause the computing device to:

generate initial provisioning settings based upon information collected from IoT devices in an environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment;

generate modified provisioning settings by applying a plurality of rules specific to the environment to the initial provisioning settings, the plurality of rules configured to modify the initial provisioning settings by adding or removing IoT devices and modifying the operational parameters; and provision the IoT devices in the environment according to the modified provisioning settings to achieve the plurality of desired conditions without human interaction.

10. The computing device of claim 9, wherein the prior provisioning information is obtained by a machine learning (ML) model.

11. The computing device of claim 9, wherein the plurality of rules are further configured to modify the initial provisioning settings by specifying a time at which the plurality of IoT devices are to be activated.

12. The computing device of claim 9, wherein the plurality of rules are further configured to modify the initial provisioning settings by specifying one or more conditions under which the plurality of IoT devices are to be activated.

13. The computing device of claim 9, wherein the plurality of rules are further configured to modify the initial provisioning settings by increasing an output of at least one of the plurality of IoT devices in the environment or decreasing an output of at least one of the plurality of IoT devices in the environment.

14. The computing device of claim 9, wherein the plurality of rules specify a minimum output for at least one of the plurality of IoT devices in the environment or a maximum output for at least one of the plurality of IoT devices in the environment.

15. A non-transitory computer-readable storage media having instructions stored thereupon which, when executed by a processor, cause a computing device to:

generate initial provisioning settings based upon information collected from IoT devices in an environment, wherein the collected information also includes prior provisioning information from IoT devices in other environments similar to the environment, wherein the initial provisioning settings comprise data identifying a plurality of the IoT devices in the environment and operational parameters for the plurality of IoT devices in the environment to achieve the plurality of desired conditions of the environment;

generate modified provisioning settings by applying a plurality of rules specific to the environment to the initial provisioning settings, the plurality of rules configured to modify the initial provisioning settings by adding or removing IoT devices and modifying the operational parameters; and provision the IoT devices in the environment according to the modified provisioning settings to achieve the plurality of desired conditions without human interaction.

16. The non-transitory computer-readable storage media of claim 15, wherein the prior provisioning information is obtained by a machine learning (ML) model.

17. The non-transitory computer-readable storage media of claim 15, wherein the plurality of rules are further configured to modify the initial provisioning settings by specifying a time at which the plurality of IoT devices are to be activated.

18. The non-transitory computer-readable storage media of claim 15, wherein the plurality of rules are further configured to modify the initial provisioning settings by specifying one or more conditions under which the plurality of IoT devices are to be activated.

19. The non-transitory computer-readable storage media of claim 15, wherein the plurality of rules are further configured to modify the initial provisioning settings by increasing an output of at least one of the plurality of IoT devices in the environment or decreasing an output of at least one of the plurality of IoT devices in the environment.

20. The non-transitory computer-readable storage media of claim 15, wherein the plurality of rules specify a minimum output for at least one of the plurality of IoT devices in the environment or a maximum output for at least one of the plurality of IoT devices in the environment.

* * * * *